US011605141B2

(12) United States Patent
Kurihara et al.

(10) Patent No.: US 11,605,141 B2
(45) Date of Patent: Mar. 14, 2023

(54) FACILITY RATING DEVICE AND FACILITY RATING METHOD

(71) Applicant: HONDA MOTOR CO., LTD., Tokyo (JP)

(72) Inventors: Tadashi Kurihara, Tokyo (JP); Hiroshi Inoue, Tokyo (JP); Yoshiaki Sugimoto, Tokyo (JP); Satoru Minowa, Tokyo (JP); Minoru Fukumori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 457 days.

(21) Appl. No.: 16/488,108

(22) PCT Filed: Feb. 19, 2018

(86) PCT No.: PCT/JP2018/005794
§ 371 (c)(1),
(2) Date: Aug. 22, 2019

(87) PCT Pub. No.: WO2018/159366
PCT Pub. Date: Sep. 7, 2018

(65) Prior Publication Data
US 2020/0065917 A1   Feb. 27, 2020

(30) Foreign Application Priority Data
Mar. 2, 2017  (JP) .............................. JP2017-039411

(51) Int. Cl.
*G06Q 50/12* (2012.01)
*H04W 4/44* (2018.01)
(Continued)

(52) U.S. Cl.
CPC ............ *G06Q 50/12* (2013.01); *H04W 4/021* (2013.01); *H04W 4/029* (2018.02); *H04W 4/44* (2018.02); *G01C 21/26* (2013.01)

(58) Field of Classification Search
CPC ...... G06Q 50/12; G06Q 30/0282; H04W 4/44; H04W 4/029; H04W 4/021
See application file for complete search history.

(56) References Cited

U.S. PATENT DOCUMENTS

2014/0093125 A1*  4/2014  Hradetzky ......... G06Q 30/0268
382/103

FOREIGN PATENT DOCUMENTS

JP   2002-207795   7/2002
JP   2007-240268 A   9/2007
(Continued)

OTHER PUBLICATIONS

International Search Report, dated May 22, 2018 (May 22, 2018), 1 page.

*Primary Examiner* — A. Hunter Wilder
(74) *Attorney, Agent, or Firm* — Rankin, Hill & Clark LLP

(57) ABSTRACT

A highly reliable facility evaluation information (rating information) that is free of arbitrary ratings. A server system includes a facility rating information creation and updating unit that grants a rating with regard to a facility to be rated on the basis of parking information. The parking information is obtained by assessing whether the present position of a mobile body, which is being carried together with a vehicle, has been parked in the area of the facility to be rated whereat parking is possible. A facility rating provision unit that outputs the rating regarding to the facility to be rated, which has been granted by the facility rating information creation and updating unit.

17 Claims, 15 Drawing Sheets

(51) Int. Cl.
*H04W 4/029* (2018.01)
*H04W 4/021* (2018.01)
*G01C 21/26* (2006.01)

(56) References Cited

FOREIGN PATENT DOCUMENTS

| | | |
|---|---|---|
| JP | 2009-180675 | 8/2009 |
| JP | 2009-181469 | 8/2009 |
| JP | 2013-200684 | 10/2013 |
| JP | 2014-044675 | 3/2014 |

* cited by examiner

FIG. 5

| ATTRIBUTE | VEHICLE CLASSIFICATION | MODEL NAME |
|---|---|---|
| FAMILY ORIENTED | MINIVAN | AAA |
| FAMILY ORIENTED | MINIVAN | BBB |
| YOUNGSTER ORIENTED | SPORTS A | CCC |
| FEMALE ORIENTED | LIGHT MOTOR VEHICLE A | DDD |
| ANNIVERSARY ORIENTED | SPORTS B | EEE |
| ANNIVERSARY ORIENTED | SEDAN B | FFF |
| | | |

FACILITY DETERMINATION PROCESSING

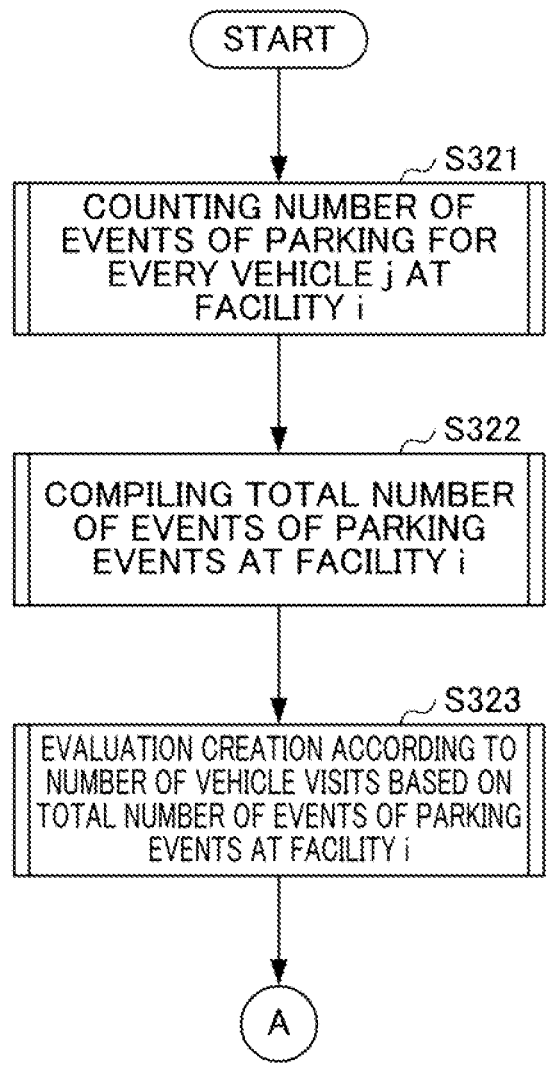

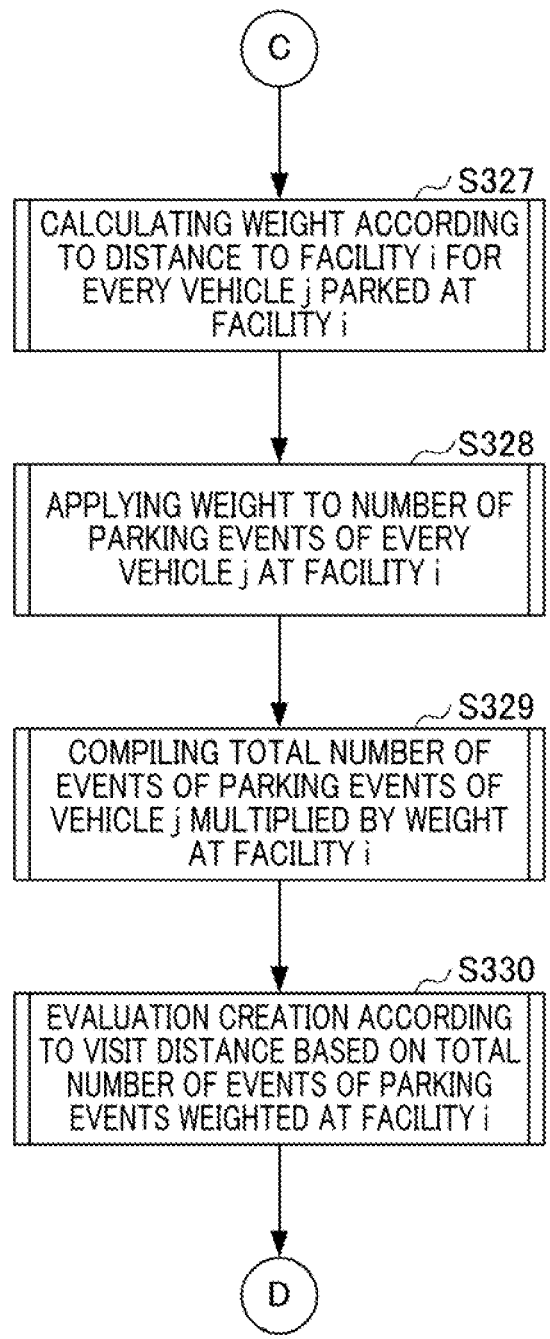

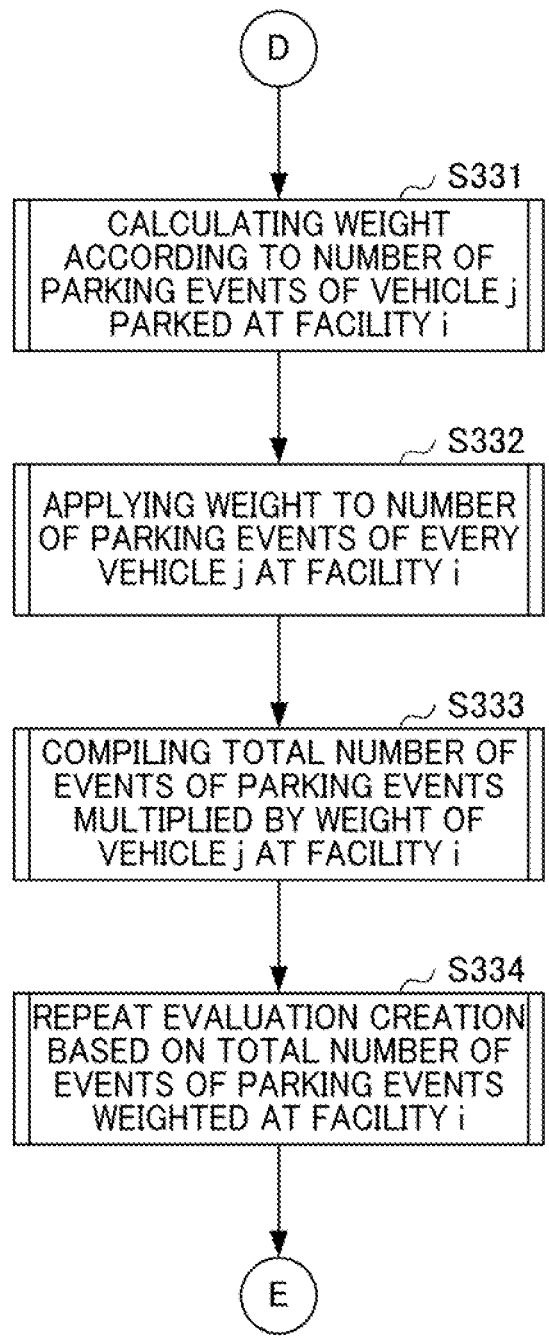

FACILITY RATING DEVICE AND FACILITY RATING METHOD

TECHNICAL FIELD

The present invention is a device and method for performing evaluation (rating) on a facility such as a restaurant, and in particular relates to a facility evaluation device and a facility evaluation method which perform evaluation of a facility such as a restaurant, based on position information of a vehicle received from a communication device equipped to the vehicle and sending current position information of the vehicle (communication car navigation device, or portable wireless terminal such as a smart phone communicably connected with the vehicle).

BACKGROUND ART

Conventionally, information of so-called "rating" for evaluating the appeal of a facility offering services such as a restaurant has been provided by a website or the like. Conventionally, by a customer having visited a facility filling out a post form on the website on another day, a server having accepted a posting has compiled several sets of this information, and provided evaluation of facilities. However, arbitrary posts are possible by posts made manually, and a problem has been inherent in that the confidence in ratings is shaken. For this reason, various rating schemes for objectively evaluating facilities have been developed. For example, Patent Document 1 (Japanese Unexamined Patent Application, Publication No. 2014-0044675) discloses the matter of referencing blog information from a portable telephone, PDA, portable game console, notebook PC, PND, car navigation device, smart phone or the like existing with a region of a target facility, and evaluating the appeal of the target facility based on the number of times having visited the target facility.

Patent Document 1: Japanese Unexamined Patent Application, Publication No. 2014-044675

DISCLOSURE OF THE INVENTION

Problems to be Solved by the Invention

However, since the technology disclosed in Patent Document 1 references the position information of various terminals capable of position measurement, it has not been possible to associate a detected position with the target facility necessarily. Although positioning capable terminals such as smart phones in general calculate the position by receiving the radio waves of GPS satellites, for positioning capable terminals such as smart phones, reception of GPS radio waves from GPS satellites becomes difficult when entering into a facility, and this causes it to no longer be possible to upload accurate position information to the server.

It should be noted that Patent Document 1, although mentioning ID information, the gender of the user, age, etc. in addition to position information as probe information, it does not disclose the practical use of other probe information.

The present invention has been made by taking into account such problems. The present invention provides a facility evaluation device and facility evaluation method which generate reliable evaluation information (rating information) of facilities, by determining whether the current position of a vehicle is parked in the parking area of a facility such as a restaurant, and gives an evaluation (rating) to this facility, based on a number of times determining that vehicles parked in the parking area of the facility.

Means for Solving the Problems

A first aspect of the present invention relates to a facility evaluation device (for example, the "server system 3" described later) including: a receiving unit (for example, the "login processing unit 301" and "current position information processing unit 302" described later) which receives a current position of a mobile body (for example, the "car navigation device 1" and "portable terminal 2" described later) that is carried along with a vehicle (for example, the "vehicle 5" described later); a facility information saving unit (for example, the "map information area 312" and "facility information area 313" described later) which stores facilities and parking area information of facilities; a facility evaluation assigning unit (for example, the "facility evaluation information creation/update unit 304" described later) which, based on parking information obtained by determining whether the current position of the mobile body is parked in a parking area of an evaluation target facility, gives an evaluation to the evaluation target facility; and a facility evaluation output unit (for example, the "facility evaluation providing unit 305" described later) which outputs an evaluation for the evaluation target facility given by the facility evaluation assigning unit.

According to a second aspect of the present invention, in the facility evaluation device as described in the first aspect, it may be configured so that the receiving unit (for example, the "login processing unit 301" and "current position information processing unit 302" described later) further receives model information of a vehicle corresponding to the mobile body; the facility evaluation assigning unit (for example, the "facility evaluation information creation/update unit 304" described later) further gives an evaluation to the evaluation target facility based on the model information; and the facility evaluation output unit (for example, the "facility evaluation providing unit 305" described later) further outputs an evaluation for the evaluation target facility based on the model information.

According to a third aspect of the present invention, it may be configured so that the facility evaluation device as described in the second aspect further includes a vehicle classification/user attribute correspondence table (for example, the "vehicle classification/user attribute correspondence table 315" described later) which associates a vehicle classification and a user attribute having a high correlation therewith; the facility evaluation assigning unit (for example, the "facility evaluation information creation/update unit 304" described later) further gives an evaluation to the evaluation target facility for every user attribute, based on the vehicle classification/user attribute correspondence table; and the facility evaluation output unit further outputs an evaluation for the evaluation target facility based on the user attribute.

According to a fourth aspect of the present invention, in the facility evaluation device as described in any one of the first to third aspects, it may be configured so that the receiving unit (for example, the "login processing unit 301" and "current position information processing unit 302" described later) further receives mobile body starting point position information, which is position information of a departure point of the mobile body, or current address (for example, home address) of a vehicle or user corresponding to the mobile body; and the facility evaluation assigning unit (for example, the "facility evaluation information creation/update unit 304" described later) further gives an evaluation to the evaluation target facility according to a distance between the mobile body starting point position information and a parking area of the evaluation target facility.

According to a fifth aspect of the present invention, in the facility evaluation device as described in any one of the first to fourth aspects, it may be configured so that the facility evaluation assigning unit (for example, the "facility evaluation information creation/update unit 304" described later) further compiles a number of times determining whether the current position of the mobile body was parked in a parking area of an evaluation target facility within a predetermined time period, and gives an evaluation to the evaluation target facility so as to weight an evaluation by mobile body having a large number of times determined as parked within a predetermined time period as higher than an evaluation by another mobile body determined as having a relative few number of times parked within a predetermined time period.

According to a sixth aspect of the present invention, in the facility evaluation device as described in any one of the first to fifth aspects, it may be configured so that the facility evaluation assigning unit (for example, the "facility evaluation information creation/update unit 304" described later) further compiles a number of times determining whether the current position of the mobile body was parked in a parking area of any facility within a predetermined time period, and gives an evaluation to the evaluation target facility so as to weight an evaluation by mobile body having a large number of times determined as parked within a predetermined time period as higher than an evaluation by another mobile body determined as having a relative few number of times parked within a predetermined time period.

According to a seventh aspect of the present invention, in the facility evaluation device as described in any one of the first to sixth aspects, it may be configured so that the facility evaluation assigning unit (for example, the "facility evaluation information creation/update unit 304" described later) further compiles a number of times determining that the current position of the mobile body was parked in a parking area of a different facility within a predetermined time period, and gives an evaluation to the evaluation target facility so as to weight an evaluation by mobile body determined as having a large number of different facilities parked within a predetermined time period as higher than an evaluation by another mobile body determined as having relatively few number of different facilities parked within a predetermined time period.

According to an eighth aspect of the present invention, in the facility evaluation device as described in any one of the first to seventh aspects, it may be configured so that the facility evaluation assigning unit (for example, the "facility evaluation information creation/update unit 304" described later) further measures a time period for which the current position of the mobile body was parked in a parking area of the evaluation target facility, and in a case of a parked time period being at least a threshold, does not give an evaluation to the evaluation target facility.

A ninth aspect of the present invention relates to facility evaluation method including steps, executed by a facility evaluation device (for example, the "server system 3" described later) including a control unit (for example, the "control unit 31" described later) and a facility information saving unit (for example, the "map information area 312" and "facility information area 313" described later) which stores facilities and parking area information of facilities, of: receiving a current position of a mobile body (for example, the "car navigation device 1" and "portable terminal 2" described later) that is carried along with a vehicle (for example, the "vehicle 5" described later); giving an evaluation to the facility based on parking information obtained by determining whether the current position of the mobile body is parked in a parking area of the facility (for example, the "step of giving facility evaluation" described later; and outputting an evaluation for the facility given in the step of giving an evaluation to the facility (for example, the "step of providing facility evaluation information" described later).

Effects of the Invention

According to the present invention, it is possible to provide a facility evaluation device and facility evaluation method which generate reliable evaluation information (rating information) of facilities by eliminating arbitrariness, by determining whether the current position of a vehicle is parked in the parking area of a facility such as a restaurant, and gives an evaluation (rating) to this facility, based on a number of times determining that vehicles parked in the parking area of the facility.

BRIEF DESCRIPTION OF THE DRAWINGS

FIG. 5 is a view showing an example of a vehicle classification/user attribute correspondence table 315;

FIG. 9A is a flowchart showing the flow of processing in a case of giving a facility evaluation by the facility evaluation system 100;

FIG. 9C is a flowchart showing the flow of processing in a case of giving facility evaluation by the facility evaluation system 100;

FIG. 9D is a flowchart showing the flow of processing in a case of giving a facility evaluation by the facility evaluation system 100;

PREFERRED MODE FOR CARRYING OUT THE INVENTION

First Embodiment

Hereinafter, a preferred embodiment of a navigation system of the present invention will be explained while referencing FIGS. 1 to 9B where appropriate.
(Functional Configuration of Facility Evaluation System 100)

First, the configuration of a facility evaluation system 100 according to a preferred embodiment of the present invention will be explained.

Figure 1:
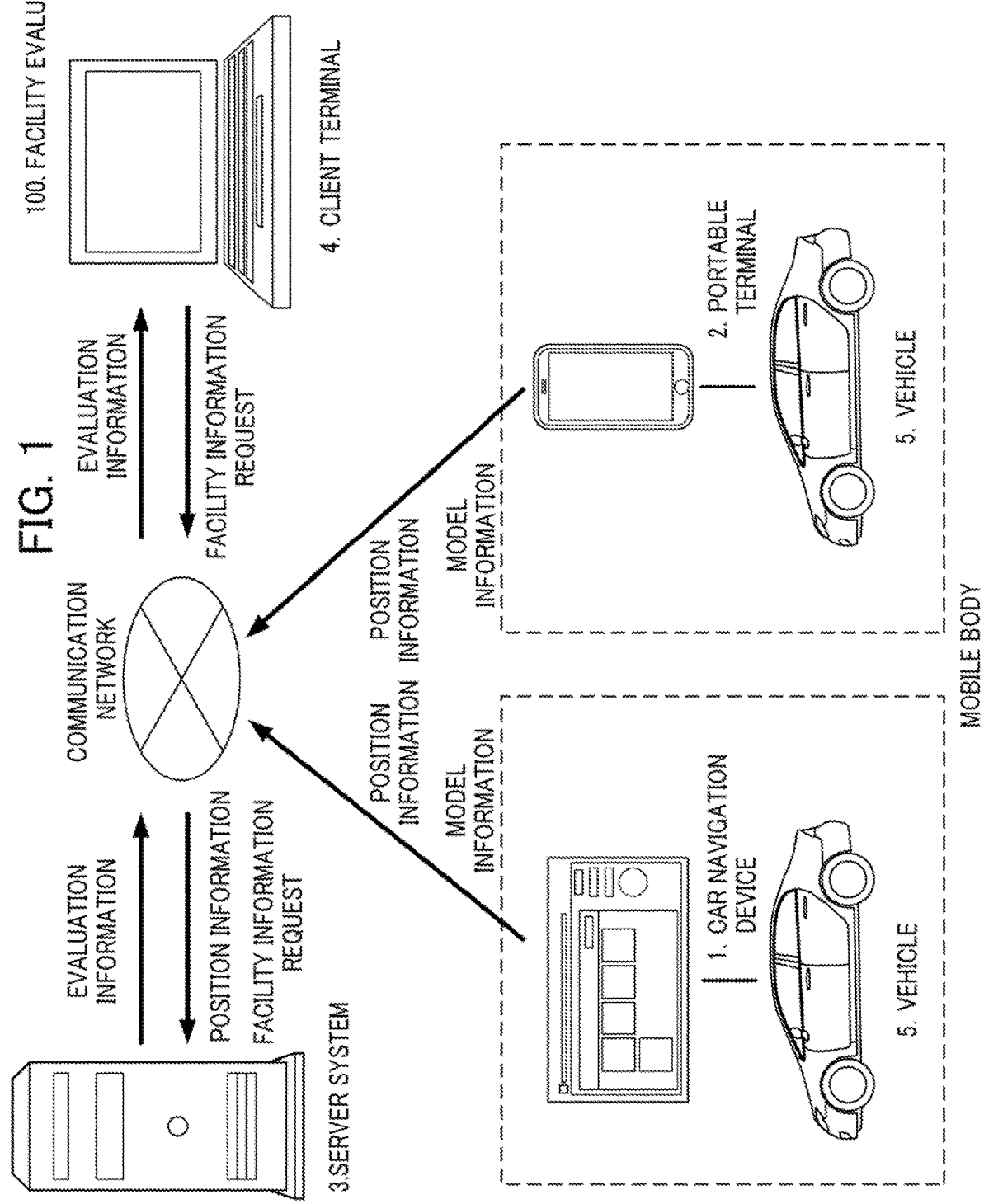
FIG. 1 is a view showing the system configuration of a facility evaluation system 100.

As shown in FIG. 1, the facility evaluation system 100 is configured to include: a car navigation device 1 equipped to a vehicle 5; a portable terminal 2; a server system 3 serving as a facility evaluation device; and a client terminal 4. It should be noted that, for the car navigation device 1 and portable terminal 2, even in the case of either one or both being present, may be either one. In the present example, mainly the car navigation device 1 will be explained; however, the portable terminal 2 is a similar configuration. It should be noted that the car navigation device 1 and portable terminal 2 may be referred to as mobile body.

The car navigation device 1 equipped to the vehicle 5 includes PND, etc. Software such as navigation (route guidance) is installed on the car navigation device 1, and based on a user's request, it is possible to perform route guidance from the current position until the destination. In addition, software for uploading information necessitated in facility evaluation at the server system 3 is installed on the car navigation device 1. It should be noted that software such as information upload necessitated in navigation (route guidance) and facility evaluation may be installed in advance. In addition, it may be appropriately downloaded as necessary while sending/receiving with the server system 3.

The portable terminal 2 is a portable telephone, smart phone, tablet terminal PDA, notebook computer, or other electronic equipment which is portable, and includes electronic equipment equipped with a wireless communication function. The software for navigation is installed in the portable terminal 2, and based on a user's request, it is possible to perform route guidance from the current position until the destination. In addition, software for uploading information necessitated in facility evaluation by the server system 3 is installed in the portable terminal 2. It should be noted that software for uploading information necessitated in navigation and facility evaluation may be installed in advance. In addition, it may be downloaded as needed during sending/receiving with the server system 3.

The server system 3 performs sending/receiving of information with the car navigation device 1, portable terminal 2 and client terminal 4 via a communication unit 32. The server system 3 receives position information, model information, etc. from the car navigation device 1 and portable terminal 2, for example. Herein, model information refers to the vehicle classification and/or model name. The server system 3 acquires parking information of a facility, by determining whether the vehicle 5 corresponding to the car navigation device 1 or portable terminal 2 parked at a parking area of the facility, and stayed at the facility, based on the position information received from the car navigation device 1 and portable terminal 2. The server system 3 creates an evaluation (rating) for each facility, based on parking information of each facility of the vehicle 5 corresponding to all car navigation devices 1 or portable terminals 2 which are communicable. The server system 3 responds to a request from the mobile body or client terminal 4, and provides evaluation information related to the facility.

In an embodiment of the present invention, although describing the server system 3 as one server, it may be established as a decentralized processing system which distributes each function of the server system 3 to a plurality of servers as appropriate. In addition, each function of the server system 3 may be realized using virtual server functions, etc. on a cloud.

The client terminal 4 browses evaluation information of facilities by performing sending/receiving with the server system 3 via the communication unit 42. As the client terminal 4, various terminals such as a personal computer, smart phone, and tablet terminal can be used. The user of the client terminal 4 may be the user of the vehicle 5, or may not be a user. The user requests information related to a specific facility from the client terminal 4 using a web browser or the like, and receives evaluation information given to the facility information requested from the server system 3. In addition, it is also possible to impart a function of the client terminal 4 to the car navigation device 1 or portable terminal 2.

Next, each configuration will be explained.
<Car Navigation Device 1>

Figure 2:
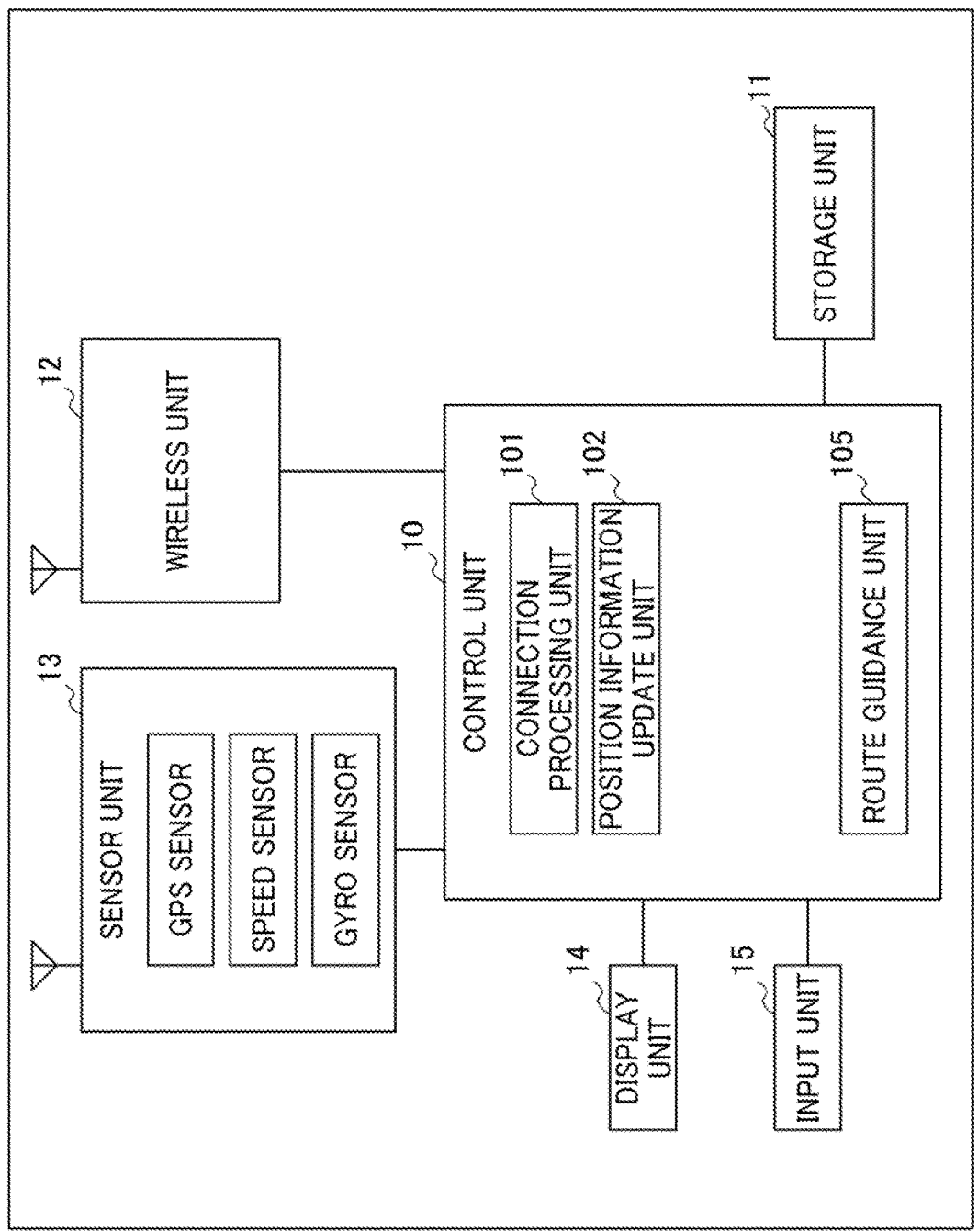
FIG. 2 is a view showing the configuration of a car navigation device 1 equipped to a vehicle 5.

As shown in FIG. 2, the car navigation device 1 equipped to the vehicle 5 at least includes a control unit 10, storage unit 11, wireless unit 12, sensor unit 13, display unit 14 and input unit 15.

The control unit 10 is configured from a microprocessor, etc., and performs control of each constitutional unit. The details will be described later.

The storage unit 11 is configured by semiconductor memory, etc., and the operating system (OS) and each program for route guidance, and further, various information such as map information and position information, are stored therein. It should be noted that it may be a configuration which stores map information in advance in the storage unit 11, or a configuration which acquires from the navigation server system 3.

The wireless unit 12 has a DSP (Digital Signal Processor), etc., and is configured to enable performing wireless communication through a wireless communication network represented by wireless communication networks such as 3G and LTE, and performing wireless communication with the navigation server system 3. The wireless unit 12 sends an identification number (hereinafter also referred to as "vehicle ID") identifying the vehicle 5, a password, current position information of the vehicle 5, model information, etc. to the server system 3. In addition, for example, it is possible to receive route information, etc. until a destination such as a facility from the server system 3.

The sensor unit 13 is configured from a GPS sensor, speed sensor, gyro sensor, etc. equipped to the vehicle 5. The sensor unit 13 includes a function as a position detection means for detecting the current position, receives GPS satellite information by the GPS sensor, and measures the current position of the vehicle 5 (latitude and longitude). In addition, it is possible to measure the current position of the vehicle 5 from autonomous navigation by equipping a speed sensor, gyro sensor, magnetic field sensor, etc., and in the case of the GPS sensor not being able to measure position from the GPS satellite signal, it is possible to measure the current position in place of this. In addition, in a case of GPS communication not being possible, it is possible to calculate the current position of the vehicle 5 using AGPS (Assisted Global Positioning System) communication, according to base station information acquired from the wireless unit 12.

The display unit 14 is configured from a display such as a liquid crystal display or organic EL panel, and receives an instruction from the control unit 10 and displays an image. The display unit 14 can display various information such as map information of the current position of the vehicle 5 and the vicinity of the current position of the vehicle 5 read from the storage unit 11, and route information until the destination acquired from the server system 3 via the wireless unit 12.

The input unit 15 is configured by an input device (not illustrated) such as physical switches called a ten-key pad, or a touch panel provided to overlay the display surface of the display unit 14. By outputting signals based on manipulation inputs from the input unit 15, e.g., depression of the ten-key pad or touching of the touch panel by the user, to the control unit 10, it is possible to perform a stop-by facility determination, and operations such as zooming-out and zooming-in of the map. It should be noted that, although not illustrated, it is possible to additionally equip a speaker 16 and microphone 17. The speaker 16 performs voice output to the driver, and the microphone 17 picks up the voice uttered by the driver, etc. By configuring in this way, it is possible to output information by voice from the speaker 16, and to input to the control unit 10 various selections and instructions by the driver (or user) inputted by voice via the microphone 17 by way of voice recognition technology.

The control unit 10 is configured by a microprocessor having a CPU, RAM, ROM, I/O, etc. The CPU executes each program read from the ROM or storage unit 11, reads information from the RAM, ROM and storage unit 11 during execution thereof, performs writing of information in the RAM and storage unit 11, and performs transfer of signals with the wireless unit 12, sensor unit 13, display unit 14 and input unit 15.

The control unit 10 causes the car navigation device 1 to function as a predetermined means (hereinafter named as "navigation unit"), by executing each program (hereinafter named as "navigation application"). For example, when running a program for route guidance, route guidance which instructs right and left turns while displaying the current position becomes possible using the position information from the sensor unit 12. In addition, by the control unit 10 executing each program, it causes a predetermined sequence (hereinafter named "navigation sequence") to be executed in the car navigation device 1.

Hereinafter, the functions possessed by the control unit 10 will be explained from the viewpoint of a route setting/ guidance unit. It should be noted that explanation based on the viewpoint of the navigation sequence (method) is omitted due to being able to explain by substituting "unit" with "sequence".

As shown in FIG. 2, the control unit 10 includes a connection processing unit 101, position information update unit 102 and route guidance unit 105.

<Automatic Start>

The car navigation device 1 automatically starts by the ignition switch of the vehicle 5 being turned ON (starting engine) by the driver. The car navigation device 1 operates until the ignition switch of the vehicle 5 is turned OFF (stopping engine) by the driver.

<Connection Processing Unit 101>

The connection processing unit 101, when the car navigation device 1 is automatically started, executes login processing to the server system 3, for example, using an identification number (vehicle ID) identifying the vehicle 5 and password, and sends current position information of the vehicle 5 calculated by the sensor unit 13 and current time information, etc. acquired from a timing unit (not illustrated) to the server system 3. In addition, the connection processing unit 101 can be configured so as to send the vehicle classification and/or model name to the server system 3. Hereinafter, vehicle classification and/or model name is also referred to as model information.

<Position Information Update Unit 102>

The position information update unit 102 periodically sends the vehicle ID, the current position information of the vehicle 5 calculated by the sensor unit 13, current time information acquired from the timing unit (not illustrated), etc. to the server system 3. It should be noted that the traveling direction of the vehicle 5 calculated by the sensor unit 13 can be included as the information to be sent. The position information update unit 102 does not send the current position information of the vehicle 5 and current time information acquired at predetermined time intervals (for example, 3 second interval) to the server system 30 each time in real time, and can put together several items (for example, put together the current position information, current time information, etc. of the vehicle 5 for 5 minute segments) and send once (so-called burst transmission). It should be noted that the acquisition time interval (for example, 3 second interval) of current position information, etc. of the vehicle 5 and number of items, etc. sent at once in the case of putting together several items and burst sending can be set in advance.

It should be noted that, for example, from when determining that the vehicle 5 arrived at a destination such as a facility by way of the route guidance unit 105 described later until the ignition switch is turned OFF (engine stop), the position information update unit 102 can send the current position information of the vehicle 5 calculated by the sensor unit 13 and current time information acquired from the timing unit (not illustrated), etc. to the server system 3.

<Route Guidance Unit 105>

The route guidance unit 105 receives the route information until a destination such as a facility inputted or selected by the user via the wireless unit 12 from the server system 3. The route guidance unit 105 executes route guidance based on the received route information. It should be noted that route information may be calculated by the car navigation device 1 (for example, route guidance unit 105) instead of receiving from the server system 3.

It should be noted that, as aforementioned, from when determining that the vehicle 5 has arrived at a destination such as facility by way of the route guidance unit 105 until the ignition switch is turned OFF (engine stop), the position information update unit 102 can send the vehicle ID, current position information of the vehicle 5 calculated by the sensor unit 13, current time information acquired from the timing unit (not illustrated), etc. to the server system 3.

Next, the portable terminal 2 will be explained.

<Portable Terminal 2>

Figure 3:
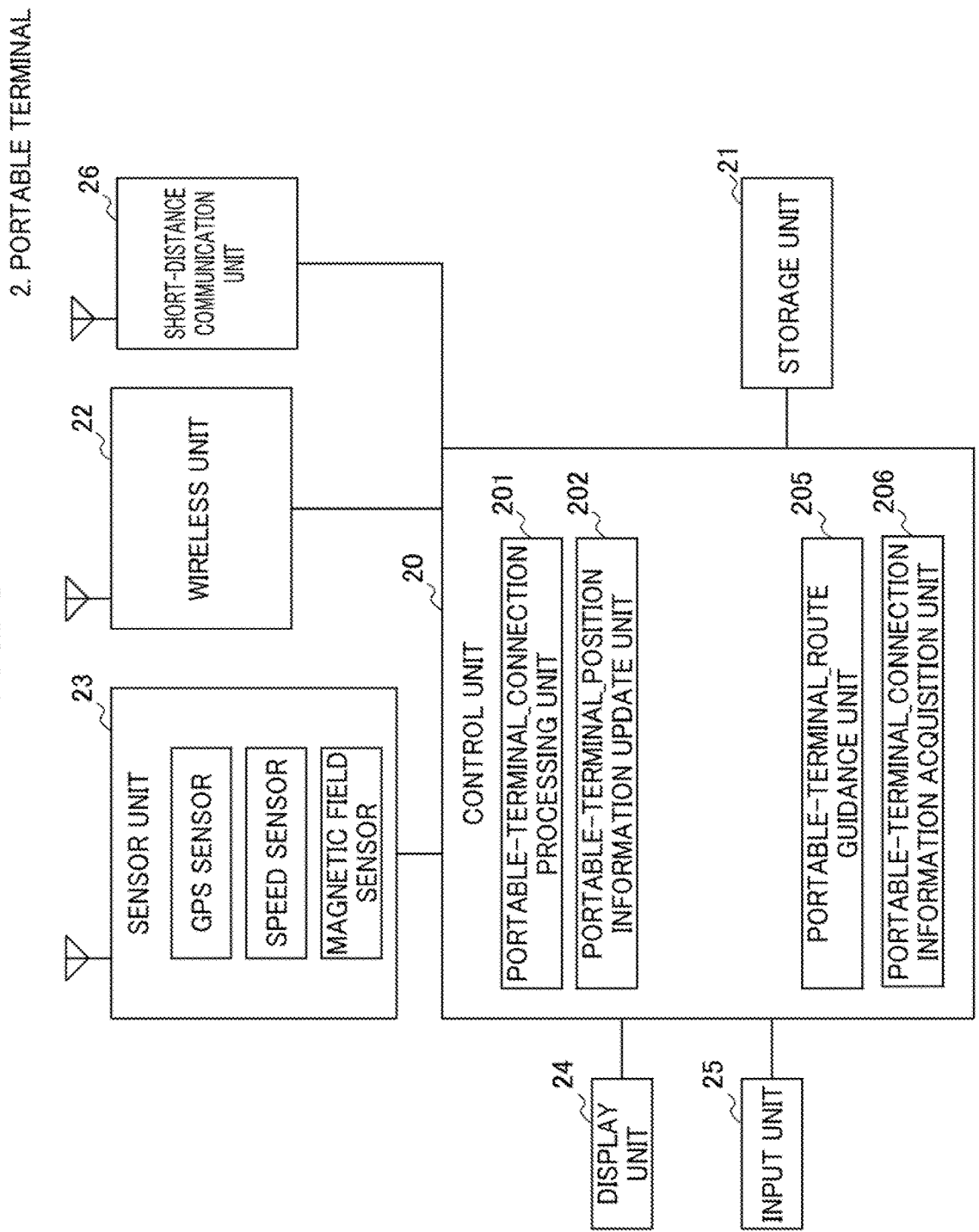
FIG. 3 is a view showing the configuration of a portable terminal 2.

As shown in FIG. 3, the portable terminal 2 at least includes a control unit 20, storage unit 21, wireless unit 22, sensor unit 23, display unit 24 and input unit 25. In addition, the portable terminal 2 can include a short-distance communication unit 26.

The control unit 20 is configured from a microprocessor, etc., and performs control of the respective constitutional units. The details are described later.

The storage unit is configured by semiconductor memory, etc., and the operating system (OS) and each program for route guidance, and further, various information such as map information, road link information, and position information are stored therein. It should be noted that it may be configured to store in advance each program for route guidance, map information, road link information, etc. in the storage unit 21. In addition, it may be configured to acquire as appropriate from the server system 3.

The wireless unit 22 has a DSP (Digital Signal Processor), etc., and is configured to enable performing wireless communication through a wireless communication network represented by a mobile telephone network such as 3G and LTE, and performing wireless communication with the server system 3. The wireless unit 22 can send to the server system 3 the current position information of the portable terminal 2, ID identifying the service subscription state (hereinafter referred to as "user ID") and password, facility information set as the destination, etc., and receive facility information and/or electronic coupon information of the facility, and further, route information from the server system 3.

The sensor unit 23 is configured from a GPS sensor, gyro sensor, magnetic field sensor, etc. The sensor unit 23 includes a function as a position detection means for detecting the current position, receives GPS satellite signals by way of the GPS sensor, and measures the current position (latitude and longitude) of the portable terminal 2. In addition, in a case of GPS communication not being possible, it is possible to calculate the current position of the vehicle 5 using AGPS (Assisted Global Positioning System) communication, according to base station information acquired from the wireless unit 22.

The display unit 24 is configured from a display such as a liquid crystal display or organic EL panel, and receives an instruction from the control unit 20 and displays an image. The display unit 24 can display various information such as map information of the current position of the portable terminal 2 and the vicinity of the current position of the portable terminal 2 read from the storage unit 21, facility information acquired from the server system 3 via the wireless unit 22, destination, route information set by the user, etc.

The input unit 25 is configured by an input device such as physical switches called a ten-key pad or touch panel provided to overlay the display surface of the display unit 24, etc. By outputting signals based on manipulation inputs from the input unit 25, e.g., depression of the ten-key pad or touching of the touch panel by the user, to the control unit 20, it is possible to perform a stop-by facility determination, and operations such as zooming-out and zooming-in of the map.

The portable terminal 2 can include, for example, a short-distance communication unit 26 by non-contact communication called NFC (Near Field Communication) or wires. Then, a wheeled vehicle includes a short-distance communication unit, for example, and in the case of the ECU (Electronic Control Unit) of the vehicle 5 being able to communicate via the short-distance communication unit 26 with the portable terminal 2, the portable terminal 2 can acquire model information (vehicle classification and/or model name) and the state of the vehicle 5 (for example, state of ignition turned ON, traveling state, state of turned OFF, etc.). More specifically, when the user possesses the portable terminal 2 and gets into the vehicle 5, and turns ON the start switch of the vehicle 5 such as an ignition switch, the vehicle 5 and portable terminal 2 are paired, and the position information measured by the vehicle 5 or portable terminal 2 is uploaded to the server system 3 from the portable terminal 2. Furthermore, when the start switch is turned OFF, the pairing between the vehicle 5 and portable terminal 2 is released, and the position when released is uploaded to the server system 3 as the final vehicle position, i.e. parked position.

The control unit 20 is configured by a microprocessor having a RAM, ROM, I/O, etc. The CPU executes each program read from the ROM or storage unit 21, reads information from the RAM, ROM and storage unit 21 during execution thereof, performs writing of information in the RAM and storage unit 21, and performs transfer of signals with the wireless unit 22, sensor unit 23, display unit 24 and input unit 25.

The control unit 20 causes the portable terminal 2 to function as a predetermined means (hereinafter named "portable terminal_navigation unit"), by executing each program (hereinafter named "portable terminal_navigation application"). For example, when starting a program for route guidance, route guidance instructing right and left turns, etc. while displaying the current position becomes possible using the position information from the sensor unit 23. In addition, by the control unit 20 executing each program, it causes the portable terminal 2 to execute a predetermined sequence (hereinafter named "portable terminal_navigation sequence").

Hereinafter, the functions possessed by the control unit 20 will be explained from the viewpoint of a portable terminal_route setting/guidance unit. It should be noted that explanation based on the viewpoint of the portable terminal_navigation sequence (method) will be omitted due to being able to explain by replacing "unit" with "sequence".

As shown in FIG. 3, the control unit 20 includes a portable terminal_connection processing unit 201, portable terminal_position information update unit 202, portable terminal_route guidance unit 205 and portable terminal_connection information acquisition unit 206.

<Portable Terminal_Connection Processing Unit 201>

The portable terminal_connection processing unit 201, when the portable terminal_navigation application is started by the user, sets the GPS sensor, etc. to ON, executes login processing using the ID identifying the service subscription state of the user (hereinafter referred to as "user ID") and password, for example, in the server system 3, and sends the current position information of the portable terminal 2 calculated by the sensor unit 23, current time information acquired from the timing unit (not illustrated), etc. to the server system 3. It should be noted that, as sending information, it is possible to include the model information, state of the vehicle 5, etc. acquired from the ECU of the vehicle 5 by the portable terminal_connection information acquisition unit 206 described later. By causing operation of the portable terminal_navigation application of the portable terminal 2 to end according to the user, the portable terminal_navigation application stops function thereof.

<Portable Terminal_Position Information Update Unit 202>

The portable terminal_position information update unit 202 periodically sends to the server system 3 the user ID, current position information of the portable terminal 2 calculated by the sensor unit 23, traveling direction, current time information acquired from the timing unit (not illustrated), etc. It should be noted that it is possible to include model information acquired from the ECU of the vehicle 5, state of the vehicle 5, etc. from the portable terminal_connection information acquisition unit 206 described later.

The portable terminal_position information update unit 202, until the portable terminal_navigation application of the portable terminal 2 is ended, periodically sends the user ID, current position information of the portable terminal 2 calculated by the sensor unit 13, current time information acquired from the timing unit (not illustrated), etc. to the server system 3.

The portable terminal_position information update unit 202, rather than sending the current position information of the portable terminal 2 and current time information acquired at predetermined time intervals (for example, 3 second interval) to the server system 30 each time in real time, and can put together several items (for example, put together the current position information, current time information, etc. of the portable terminal 2 for 5 minute amounts) and send once (so-called burst transmission). It should be noted that the acquisition time interval of current position information, etc. of the portable terminal 2 and number of items, etc. sent at once in the case of putting together several items and burst sending can be set in advance.

<Portable Terminal_Route Guidance Unit 205>

The portable terminal_route guidance unit 205 can receive the route information until a destination such as a facility inputted or selected by the user via the wireless unit 22. The portable terminal_route guidance unit 205 can execute route guidance based on the received route information. In a case of starting route guidance by the portable terminal 2, after the user gets out of the vehicle 5, it becomes possible to continue route guidance even in a case of walking or using public transportation. It should be noted that, in place of receiving route information from the server system 3, it may be configured so as to calculate by way of the portable terminal 2 (for example, portable terminal_route guidance unit 205).

In a case of not using route guidance by the route guidance unit 205 of the portable terminal 2, it may end a task of the portable terminal_route guidance unit 205.

<Portable Terminal_Connection Information Acquisition Unit 206>

The portable terminal_connection information acquisition unit 206, by communicating with the ECU (Electronic Control Unit) of the vehicle 5 via the short-distance communication unit 26, can acquire model information (vehicle classification and/or model name), and the state of the vehicle 5 (for example, state of ignition turned ON, traveling state, state of turned OFF, etc.). It should be noted that the portable terminal 2, in the case of not being able to communicate via the short-distance communication unit with the ECU (Electronic Control Unit) of the vehicle 5, can be configured so as to notify the model information (vehicle classification and/or model name) to the server system 3 by way of manual input. The portable terminal_connection information acquisition unit 206 can send the model information (vehicle classification and/or model name) acquired from the ECU of the vehicle 5 and the state of the vehicle 5 (for example, state of ignition turned ON, traveling state, state of turned OFF, etc.) to the server system 3 via the wireless unit 22. By configuring in this way, the server system 3 can determine if the user carrying the portable terminal 2 is boarding the vehicle 5, this vehicle 5 has the ignition turned ON, this vehicle 5 is traveling, this vehicle 5 has the ignition turned OFF, etc.

Next, the server system 3 will be explained.

<Server System 3>

Figure 4:
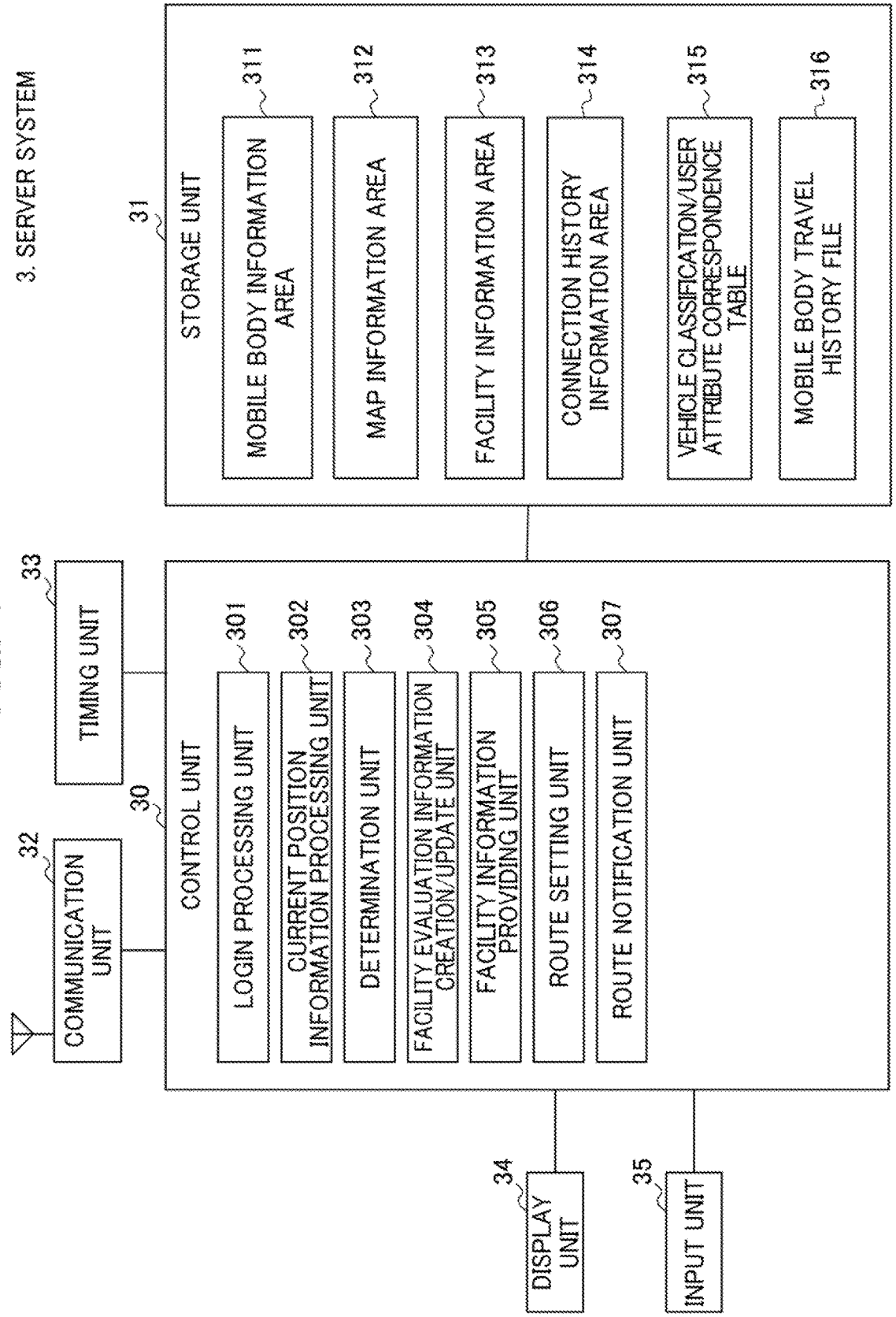
FIG. 4 is a view showing the configuration of a server system 3.

As shown in FIG. 4, the server system 3 at least includes a control unit 30, storage unit 31, communication unit 32, timing unit 33, and further a display unit 34 as necessary.

The control unit 30 is configured by a processor having a CPU, RAM, ROM, I/O, etc., and performs control of each constitutional unit. The CPU executes each program for facility evaluation read from the RAM, ROM or storage unit 31, reads information from the RAM, ROM and storage unit 31 during execution thereof, performs writing of information to the RAM and storage unit 31, and performs transfer of signals with the communication unit 32. The details are described later.

The storage unit 31 is configured by semiconductor memory, a hard disk drive, or the like, and the operating system (OS) and various information is stored such as the software called applications being saved therein. For this reason, various storage areas are ensured in the storage unit 31 such as a mobile body information area 311, a map information area 312, a facility information area 313, a connection history information area 314, a vehicle classification/user attribute correspondence table 315 and a mobile body travel history file 316. It should be noted that these storage areas may each be ensured independently in the storage unit 31, and may configure a plurality of storage areas such as the map information area 312 and facility information area 313 integrally.

The information related to the mobile body (car navigation device 1 and portable terminal 2) is saved in the mobile body information area 311 of the storage unit 31. The mobile body information (record) stored in the mobile body information area 311 is uniquely managed according to mobile body identification information (hereinafter referred to as "mobile body ID") for identifying each mobile body. Herein, the mobile body ID can use a number uniquely assigned to the car navigation device 1 and portable terminal 2, and further, the vehicle 5. In the case of being the car navigation device 1 or portable terminal 2, for example, it is possible to establish the telephone number given to the SIM of the mobile telephone network as the mobile body ID. In addition, in the case of being the vehicle 5, it is possible to establish the VIN uniquely given to the vehicle 5 (vehicle identification number) or number of the number plate thereof as the mobile body ID. It is preferable to configure so that the vehicle 5 corresponding to the mobile body (car navigation device 1 and portable terminal 2) or address of the user (for example, home address) is saved in the mobile body information. By configuring in this way, it becomes possible to accurately compile how far separated from their home to the facility the user has gone out, as described later.

In addition, it is preferable for the model information (vehicle classification and/or model name) of the corresponding vehicle 5 to be associated with the mobile body ID and stored in the mobile body information. Herein, the vehicle classification is a vehicle classification such as minivan or sedan, for example. In addition, the model name is a model name such as "Stepwagon (registered trademark)" or "Inspire (registered trademark)", for example. As the model information, either one of the vehicle classification and model name, or both may be saved.

However, as mentioned earlier, regarding the portable terminal 2, when the user is carrying the portable terminal 2 and boards the vehicle 5, and a start switch of the vehicle 5 such as the ignition switch is turned ON, the vehicle 5 and portable terminal 2 are paired. For this reason, for example, in a case of the user having several vehicles 5, the vehicle 5 corresponding to the portable terminal 2 may not always be the same vehicle 5, or the same vehicle type. In such as case, the portable terminal 2 may be configured so as to evaluate based on the vehicle 5 paired with the portable terminal 2. In addition, in the case of associating the portable terminal 2 and vehicle 5 in advance, a tendency related to a facility used by this user is considered not to change from the case of the vehicle 5 normally boarded; therefore, it may be configured so as to evaluate based on model information associated in advance with the portable terminal 2.

In the map information area 312 of the storage unit 31, information related to man-made features such as roads and facilities, map information for navigation, road information, facility position information, parking-lot information, etc. are stored in advance. Display map data for displaying the background such as roads and road maps; road network data which includes position information of nodes (for example, junctions of roads, inflection points, end points, etc.) and classification information thereof, position information of links which are paths coupling between each node and classification information thereof, link cost data related to cost information of all links (for example, distance, required time, etc.); and the like are include in the map information. Information of so-called road maps such as classification of roads and traffic lights is saved in the road information. The facility position information is saved as information of latitude and longitude by position information of each facility. Herein, in the case of a facility saved in the facility information area 313 described later, it is possible to associate with facility identification information (hereinafter referred to as "facility ID"). The parking-lot information is saved as information of latitude and longitude by the position information of a parking lot. In the case of the parking lot being a parking lot of each facility, the facility and parking lot are saved to be associated.

In addition, traffic information received from a traffic information center or the like is stored together with the recording time at which receiving this traffic information in the map information area 312 of the storage unit 31. Factors affecting travel cost such as the number of traveling vehicle every link, travel required time, traffic jam information, traffic regulation information and weather information are included in the traffic information. In addition, past traffic information of links, etc. are also recorded.

In the facility information area 313 of the storage unit 31, information of each facility is stored, including identification information of a facility (facility ID), name, category, telephone number, address, business hours, position information specified by latitude, longitude, etc., a menu offered if the facility is a restaurant, facility information related to products and services, availability information, coupon issuance information, etc. The facility ID is unique identification information given to every facility. The facility ID is preferably stratified for every facility classification, and further by genre among the respective facility classifications, whereby the ID is given. For example, as the facility classification, store type such as restaurant, supermarket and sports gym can be exemplified. Furthermore, in a case of the facility classification being restaurant, as stratification of the genre type, genres such as Japanese food, Italian food and coffee shop can be exemplified. The facility classification, genre, etc. are not limited to these. In addition, information related to the facility such as the business hours, telephone number of contact, and menu provided if being a restaurant is saved in the facility information. The facility information is always available in response to a request from the mobile body (car navigation device 1 and portable terminal 2) or client terminal 4. It should be noted that it may be configured to store in the facility information area 313 the status of the facility for every facility ID (for example, reservation information showing each time slot of the facility, reservation status at the facility for every user, the availability, etc.), coupon information which is discount information such as an electronic coupon offered by this facility, conditions related to distribution of this facility information (for example, term of validity of this facility information, distribution time slot of this facility information, etc.), customer attendance information (for example, customer appeal information guided to the facility by the delivery information, coupon use information, etc.).

In addition, the facility information area 313 stores the facility evaluation information given to each facility by the control unit 30 described later, to correspond to the facilities stored in the facility information area 313. The facility evaluation information given to each facility is stored to correspond to the facilities stored in the facility information area 313. The facility evaluation information can be realized by a point method which establishes a perfect score as 5 points, for example, or realized by icons such as metals of gold, silver and bronze, or a number of stars. In addition, it is also possible to write a comment related to facility evaluation information from the client terminal 4 (or car navigation device 1 and portable terminal 2 which is the mobile body).

The facility evaluation information includes at least the following 6 types.

(1) evaluation by number of vehicle visits according to total value of the number of vehicles 5 having visited the evaluation target facility with a predetermined time period (provided that, in the case of the same vehicle 5 visiting several times, the number of times thereof is counted) (hereinafter referred to as "number of vehicle visits_evaluation);

(2) evaluation according to user attribute calculated based on number of vehicle classification visits compiling the number of vehicles 5 visiting the evaluation target facility within a predetermined time period for every vehicle classification (or model name) (hereinafter referred to as "user attribute_evaluation);

(3) weighted evaluation according to visit distance from one's home, adjusted so that the evaluation value becomes higher when there are many vehicles 5 visiting this evaluation target facility from far away within a predetermined period (hereinafter referred to as "visit distance_evaluation");

(4) weighted evaluation according to repeat number of times adjusted so that the evaluation of the evaluation target facility becomes higher when the vehicles 5 having many repeat times (repeater) visiting within a predetermined time period visits the evaluation target facility (hereinafter referred to as "repeat_evaluation");

(5) weighted evaluation according to facility usage frequency adjusted so that, when the vehicle 5 having many times visiting ("usage times") any facility within a predetermined time period visits this evaluation target facility, the evaluation value of this evaluation target frequency becomes higher (hereinafter referred to as "usage frequency_evaluation");

(6) weighted evaluation according to several facility users adjusted so that, when there are many visits of the vehicle 5 having a large number of events of different used facilities visited to a plurality of facilities ("number of events of used facilities") within a predetermined time period (i.e. people with wide variation in visited facilities), the evaluation value becomes higher. It should be noted that, in (2), it may be configured so as to conduct vehicle classification_evaluation based on the number of vehicle classification visits totaled for every vehicle classification (or model name). The above facility evaluation information is always available to the control unit 30 in response to a retrieval request from the mobile body (car navigation device 1 or portable terminal 2) or client terminal 4. The details of each evaluation are described later.

A connection history record managing for every mobile body ID the mobile body position information, time information, destination information, traveling direction of vehicle 5 (or portable terminal 2), etc. periodically sent from the mobile body (car navigation device 1 equipped to the vehicle 5 or portable terminal 2) is stored in the connection history information area 314 of the storage unit 31. The mobile body position information stores information of the current position successively received from the mobile body. It should be noted that reception may be receiving once every few seconds, or may be configured so as to collectively receive at a fixed time period or timing such as when starting an application on the mobile body side. In addition, the model information (vehicle classification and/or model name) sent from the mobile body (car navigation device 1 or portable terminal 2) and state of the vehicle 5 (state of ignition turned ON, traveling state, state of turned OFF, etc.) are stored in the connection history record which manages every mobile body ID.

In the vehicle classification/user attribute correspondence table 315 of the storage unit 31, data associating the vehicle classification (or model name) and the user attribute having a high correlation therewith is stored. FIG. 5 shows an example of a vehicle classification/user attribute correspondence table 315. It should be noted that it is preferable for the vehicle classification to be associated with the model name. As shown in FIG. 5, generally, depending on the vehicle classification (or model name), a correlation of the vehicle classification (or model name) with the attribute of the user has been found to some extent. For example, there are correlations such as a user who buys minivans which can be boarded by many people having a high proportion of being a family composition of young children of elementary school age or younger. In addition, there are correlations such as, with the vehicle 5 of sports type, small sports cars which show being a small-size sports type have a large percentage of young people, and many elderly high-income people with a large-type sports car which show being a large sports type.

The model information of the vehicle 5 corresponding to the mobile body (vehicle information and/or model name), the time information at which the ignition switch of the vehicle 5 was turned ON (engine start), the position information of the vehicle 5 at this time, time information at which the ignition switch of the vehicle 5 was turned OFF (engine stop) and position information of the vehicle 5 at this time, and information arrived at by compiling the travel distance of the vehicle 5 from the engine start time until engine stop, etc. are recorded in the mobile body travel history file 316 of the storage unit 31
The details are described later.

The communication unit 32 implements a communication protocol which can conduct wired communication (for example, Internet access, etc.) or wireless communication, in a case of sending/receiving with a facility terminal 4.

The control unit 30 causes the server system 3 to function as a predetermined means (hereinafter named "facility evaluation information creation control unit") by executing the respective programs. In addition, the control unit 30 causes the server system 3 to execute predetermined steps (hereinafter named "facility evaluation information creation/control step") by executing the respective programs.

Hereinafter, functions possessed by the control unit 30 will be explained from the viewpoint of a facility evaluation information creation/control unit. It should be noted that an explanation based on the viewpoint of the facility evaluation information creation/control step (method) is omitted due to being able to explain by substituting "unit" with "step".

As shown in FIG. 4, the control unit 30 includes a login processing unit 301, current position information processing unit 302, determination unit 303, facility evaluation information creation/update unit 304 serving as a facility evaluation unit, facility evaluation information providing unit 305 serving as a facility evaluation output unit, route setting unit 306, and route notification unit 307.

<Login Processing Unit 301>

The login processing unit 301 executes login processing from the mobile body (car navigation device 1 or portable terminal 2) to perform connection processing with the mobile body, and creates a connection history record for managing the position information, time information, travel direction, parking information, destination information, etc. sent from the mobile body, in the connection history information area 314. In addition, the login processing unit 301 executes login processing from the client terminal 4.

<Current Position Information Processing Unit 302>

The current position information processing unit 302 adds and updates the current position information, time information, travel history information, etc. periodically sent from the mobile body (car navigation device 1 or portable terminal 2) in the aforementioned connection history record, respectively. In addition, from when the vehicle 5 arrives at the destination until the ignition switch is turned OFF (engine stop), the current position information, time information, travel history information, etc. sent from the mobile body (car navigation device 1 or portable terminal 2) are added and updated in the connection history record. It is preferably for the current position information processing unit 302 to periodically (or in real time) create and update a file (referred to as "mobile body travel history file 316") compiling the model information of the vehicle 5 (vehicle information and/or model name), time information at which the ignition switch of the vehicle 5 was turned ON (engine start) and position information of the vehicle 5 at this time, time information at which the ignition switch of the vehicle 5 was turned OFF (engine stop) and position information of the vehicle 5 at this time, travel distance of the vehicle 5 from engine start until engine stop, etc. for every mobile body ID, based on the connection information record.

<Determination Unit 303>

The determination unit 303 determines whether or not the vehicle 5 corresponding to the mobile body (car navigation device 1 or portable terminal 2) actually stayed at the evaluation target facility. For example, the determination unit 303 can determine whether this vehicle 5 was parked in the parking area of the evaluation target facility based on the position information of the vehicle 5 at the moment when the vehicle 5 starts the engine, based on the connection history record recorded in the mobile body travel history file 316 or connection history information area. For example, it is determined whether the position of this vehicle 5 matches the address of the evaluation target facility, or in the case of the difference between the position of this vehicle 5 and position of the evaluation target facility being within a first threshold (e.g., 50 m) set in advance, staying (entering the store) at the evaluation target facility. In addition, based on the time information at which the most recent engine stop prior to the engine of this vehicle 5 starting, the determination unit 303 calculates the parked time of parking at this position. In the case of the parked time of the vehicle 5 exceeding the first time set in advance, the determination unit 303 determines the user of this vehicle 5 as not being a customer of this facility, and as being an employee, construction-related person, or the like of this facility. The determination unit 303 stores this determination result information in the mobile body travel history file 316. Herein, the determination result information includes parking information indicating whether the user of this vehicle 5 parked at this facility, the facility ID of this facility at which parked, facility parking time, and information indicating whether the user of the vehicle 5 is a customer of this facility. It should be noted that execution of the determination unit 303 may be either of mini-batch processing or batch processing.

<Facility Evaluation Information Creation/Update Unit 304>

The facility evaluation information creation/update unit 304, based on information recorded in the mobile body travel history file 316, stores in the facility information area 313 a facility evaluation information database consisting of facility evaluation information giving an evaluation from six different viewpoints for the evaluation target facility within a predetermined time period, i.e. (1) number of vehicle visits_evaluation, (2) user attribute_evaluated vehicle classification_evaluation, (3) visit distance_evaluation, (4) repeat_evaluation, (5) usage frequency_evaluation and (6) facility variation_evaluation. It should be noted that, since it is possible to calculate the vehicle classification_evaluation in the course of calculating (2) user attribute_evaluation, it can be configured so as to include the vehicle classification_evaluation based on the (2') number of vehicle classification visits compiled for every vehicle classification (or model name). In addition, the facility evaluation information creation/update unit 304, upon creating six types of facility evaluation information, may be configured so as to evaluate a facility located in this regional area for every arbitrary regional area. The facility evaluation information database is configured, by any retrieval method designating the aforementioned facility information, so as to be able to retrieve facility corresponding thereto. It should be noted that the facility evaluation information creation/update unit 304 can update evaluation information as appropriate (for example, every predetermined time period).

<Creation/Update of Number of Vehicle Visits_Evaluation>

The facility evaluation information creation/update unit 304, by counting the number of vehicles 5 parked in the parking lot (parking area) of the evaluation target facility within a predetermined time period (e.g., 1 month, 3 months, 6 months, 1 year, etc.) based on the information recorded in the mobile body travel history file 316, calculates the total value for the number of vehicles parked at the parking lot (parking area) of the evaluation target facility, and gives an evaluation of the evaluation target facility based on this total value. As the number of vehicle visits_evaluation, in the case of the evaluation target facility being a restaurant, for example, each facility classified as a restaurant may be arranged in descending order of the total value of the number of parked vehicles, and ranking (e.g., of 5 stages) may be done based on this order. For example, it is possible to compare with the number of vehicles 5 parked in the parking lot of the evaluation target facility within a predetermined time period, and give a level of 5 stages to this facility. In the case of ranking each facility in descending order of the number of vehicles having visited, e.g., case of facility falling in the range of 20% from the top among the overall ranking, setting the number of vehicle visits_evaluation for this facility as 5; the facility falling within the range of 40% to 20% from the top among the overall ranking, setting the number of vehicle visits_evaluation for this facility as 4; and similarly below it is possible, in a case of falling in the range of 60% to 40% from the top, to set the number of vehicle visits_evaluation as 3; in the case of falling in the range of 80% to 60% from the top, to set the number of vehicle visits_evaluation as 2; and in the case of falling in the range of 20% from the bottom, to set the number of vehicle visits_evaluation as 1. It should be noted that this setting of the number of vehicle visits_evaluation is merely an example, and it is possible to appropriately select a function such that the value of the number of vehicle visits_evaluation of a facility having a large number of vehicle visits is equal to or greater than the value of the number of vehicle visits_evaluation of a facility having a small number of vehicle visits. It should be noted that, in place of a relative value of the number of vehicle visits, the number of vehicle visits_evaluation may be set based on the absolute value of the number of vehicle visits. In addition, it is not limited to 5 stages, and ranking may be done in any plurality of stages. In addition, for restaurants, a facility belonging to a specific genre (e.g., Japanese food, Italian food, French food, dining bar, family restaurant, etc.) may be set as the target, and each facility may be arranged in descending order of the total value of number of parked vehicles, and ranked based on this order. By configuring in this way, upon a user browsing the evaluation information of the evaluation target facility, the user becomes able to designate the target genre via the client terminal 4, and retrieve facilities having a high number of vehicle visits_evaluation.

<Creation/Update of User Attribute_Evaluation>

The facility evaluation information creation/update unit 304, based on information recorded in the mobile body travel history file 316, can give an evaluation of the evaluation target facility, based on the number of vehicle classification visits compiling the number of vehicles 5 having visited the evaluation target facility within a predetermined time period for every vehicle classification (or model name). More specifically, based on data associating the vehicle classification (or model name) and user attribute having a high correlation therewith stored in the vehicle classification/user attribute correspondence table 315 of the storage unit 31, it is possible to count the number of vehicles 5 parked at the evaluation target facility within a predetermined time period for every vehicle classification (or model name), and give a user attribute_evaluation based on the user attribute by replacing with the user attribute having a high correlation with the vehicle classification (or model name). By configuring in this way, the facility evaluation information creation/update unit 304 gives each of the labels such as "family oriented", "youngster oriented", "female oriented" and "anniversary oriented" to the evaluating axis, corresponding to the vehicle classification/user attribute correspondence table 315 shown in FIG. 5. The facility evaluation information creation/update unit 304, for example, increases the evaluation on the axis of family oriented, in the case of being determined that a family oriented vehicle 5 (or model) was parked. By accumulating such evaluations, it becomes possible to create and present a "recommended class" indicating to which user class an evaluation target facility is recommended. It should be noted that the facility evaluation information creation/update unit 304 may be configured so as to present the number of parked vehicles of every vehicle classification (or model name). By configuring in this way, it becomes possible to create and present to the users of which vehicle classification (or model name) to recommend, for example.

<Creation/Update of Visit Distance_Evaluation>

By weighting the number of times visiting according to if the vehicle 5 visiting the evaluation target facility came from near the evaluation target facility or came from far based on the information recorded in the mobile body travel history file 316, the facility evaluation information creation/update unit 304 can give an evaluation of the evaluation target facility so that the evaluation value is higher when there are many vehicles visiting the evaluation target facility from far away. More specifically, the facility evaluation information creation/update unit 304, in the case of the travel distance from the position of the current address (e.g., home address) of the vehicle 5 (or user) until the parking position of the evaluation target facility exceeding a first distance set in advance, by weighting the number of parked cars at the evaluation target facility of this vehicle 5, adjusts so that the number of vehicle visits in a predetermined time period becomes larger than a substantial value when there are many vehicles visiting the evaluation target facility from far away. Then, for example, similarly to as explained in <Creation/Update of Number of Vehicle Visits_Evaluation>, it may be configured to give a level of 5 stages to this facility, by comparing the adjusted number of vehicles 5 parked at the parking lot of the evaluation target facility within a predetermined time period. It should be noted that the facility evaluation information creation/update unit 304 may be configured so as to divide the values of weighting into a plurality of stages, by providing a plurality of thresholds according to the travel distance from the position of the current address (e.g., home address) of the vehicle 5 or user until the parking lot position of the facility. By accumulating such evaluations, it becomes possible to present a facility having many visits of people living at a location far from the facility. By configuring in this way, the facility having users visiting from far away is evaluated highly, and it is possible to visualize "facility wanting to visit even from far away". However, in the case of the travel distance from the position of the current address (e.g., home address) of the vehicle 5 (or user) until the parking lot position of the facility exceeding a second distance (>first distance) set in advance, it is preferable to configure so that the facility evaluation information creation/update unit 304 does not set as a compiling target. By configuring in this way, it is possible to remove vehicles 5 having a high possibility of only unexpectedly stopping by in the middle of a trip from the number of visiting vehicles, and a more accurate totaling becomes possible. It should be noted that, in the visit distance_evaluation, the facility evaluation information creation/update unit 304 may adopt the distance on the map, for example, in place of the travel distance from the position of the current address (e.g., home address) of the vehicle 5 (or user) until the parking lot position of the evaluation target facility.

<Creation/Update of Repeat_Evaluation>

The facility evaluation information creation/update unit 304, based on the information recorded in the mobile body travel history file 316, by weighting the number of visits in the case of the vehicle 5 having visited the evaluation target facility being a vehicle having many times (repeat number of times) visited this evaluation target facility within a predetermined time, can give an evaluation of the evaluation target facility so that the evaluation value of this evaluation target facility becomes higher when the vehicle 5 having many repeat number of times (repeater) visits the evaluation target facility. More specifically, the facility evaluation information creation/update unit 304 adjusts so that the number of vehicle visits to the evaluation target facility in a predetermined period is larger than a substantial value in a case of the vehicle 5 having many repeat times visiting, by weighting the number of times parked at the evaluation target facility of the vehicle 5 which has a repeat number of times within a predetermined time period exceeding a threshold repeat number of times set in advance, based on the information recorded in the mobile body travel history file 316. Then, similarly to as explained in <Creation Update of Number of Vehicle Visits_Evaluation>, for example, it may be configured so as to give a level of 5 stages to this facility, by comparing the adjusted number of vehicles 5 parked at the parking lot of the evaluation target facility within a predetermined time period. It should be noted that the facility evaluation information creation/update unit 304 may be configured to divide the value of weighting into a plurality of stages, by providing a plurality of thresholds according to the repeat number of times. According to this configuration, evaluation reflecting repeaters more than the number of vehicle visits_evaluation, which simply compiles the number of times within a fixed time period, becomes possible. In other words, since a facility where ten people have visited ten times each comes to be evaluated higher than a facility where a hundred people visited once each within a fixed time period, it becomes possible to visualize "store wanting to visit again and again".

<Creation/Update of Usage Frequency_Evaluation>

The facility evaluation information creation/update unit 304 can give an evaluation of the evaluation target facility so that the evaluation value of this evaluation target facility becomes higher when a vehicle 5 having a high facility usage frequency visits the evaluation target facility, by weighting the visited number of times of this vehicle 5, in a case of the vehicle 5 having visited the evaluation target facility being a vehicle having many times (facility usage frequency) visited any facility within a predetermined period, based on the information recorded in the mobile body travel history file 316. More specifically, the facility evaluation information creation/update unit 304 adjusts so that the number of vehicle visits to an evaluation target facility within a predetermined time period becomes larger than a substantial value, in the case of the vehicle 5 having a large facility usage frequency visiting, by detecting a vehicle 5 having a facility usage frequency within a predetermined time period exceeding a facility usage frequency threshold set in advance based on the information recorded in the mobile body travel history file, and weighing the parked number of times at the evaluation target facility of the detected vehicle 5. Then, for example, similarly to as explained in <Creation/Update of Number of Vehicle Visits_Evaluation>, it may be configured so as to compare the adjusted number of vehicles 5 parked in the parking lot of the evaluation target facility within a predetermined time period, and give a level of 5 stages to this facility. It should noted that the facility evaluation information creation/update unit 304 may be configured so as to divide the weighted value into a plurality of stages, by providing a plurality of thresholds according to the facility usage frequency of the vehicle 5. By accumulating such evaluations, it becomes possible to present a facility having many visits of people having a high facility usage frequency.

<Creation/Update of Facility Variation_Evaluation>

The facility evaluation information creation/update unit 304 can give an evaluation of an evaluation target facility, so that the evaluation value of this evaluation target facility becomes higher when a vehicle 5 having a large number of events of different used facilities visiting the evaluation target facility, by weighting the visit number of times of this vehicle 5, in the case of the vehicle 5 visiting the evaluation target facility being a vehicle 5 having a large number of events of different facilities visited within a predetermined time period (number of events of used facilities counted with a visited facility as 1 event irrespective of the visit event number), based on the information recorded in the mobile body travel history file 316. More specifically, the facility evaluation information creation/update unit 304 adjusts so that the number of vehicle visits to the evaluation target facility in a predetermined time period becomes larger than a substantial value, in the case of the vehicle 5 having a large number of events of different used facilities visiting, by detecting a vehicle 5 having a number of events of different used facilities with a predetermined period exceeding a used facility event number threshold set in advance, and weighting the parked number of times at the evaluation target facility of the detected vehicle 5, based on the information recorded in the mobile body travel history file 316. Then, for example, similarly to as explained in <Creation/Update of Number of Vehicle Visits_Evaluation>, it may be configured so as to compare with the adjusted number of vehicles 5 parked at the parking lot of the evaluation target facility within a predetermined time period, and give a level of 5 stages to this facility. It should be noted that the facility evaluation information creation/update unit 304 may be configured so as to divide the weighted value into a plurality of stages, by providing a plurality of thresholds according to different used facility event number of the vehicle 5. By accumulating such evaluations, it becomes possible to present a facility having many visits of people of a broad variation of visited facilities, e.g., people knowing more various facilities. In the above way, the facility evaluation information creation/update unit 304 creates and updates evaluations of each facility corresponding to the facilities stored in the facility information area 313, and stores in the facility information area 313 of the storage unit 31.

<Facility Information Providing Unit 305>

A facility information providing unit 305, responding to receiving a retrieval request or browsing request of facilities via the communication unit 32 from the car navigation device 1, portable terminal 2 or client terminal 4, retrieves facility information satisfying the designated conditions, and responds to the car navigation device 1, portable terminal 2 or client terminal 4. More specifically, the facility information providing unit 305 may be configured so as to present facility information in response to receiving a retrieval request for facilities, based on the facility information satisfying this retrieval request extracted by the facility retrieval unit 304. In addition, the facility information providing unit 305, in response to receiving a browsing request for facilities, may be configured so as to present facility information of this browsing request extracted by the facility retrieval unit 304. It may be configured so as to allow a desired type of evaluation (evaluation selected from the aforementioned 6 types of evaluations) of the user and evaluation level to be inputted, and select and present facilities according to the desired evaluation level of the user.

<Route Setting Unit 306>

In response to receiving from the car navigation device 1 or portable terminal 2, for example, position information of at least one facility selected from among facility information sent from the facility information providing unit 305, the route setting unit 306 can set the position information of this selected at least one facility as a destination. The route setting unit 306 calculates route information from the current position of the vehicle 5 until the facility set as the destination. Upon calculation of the route information, the optimal route is calculated after considering various conditions such as the arrival time and use of toll roads, using the traffic information and map information stored in the map information area 312 of the storage unit 31. Herein, optimal route is a route best satisfying a targeted condition designated by the user, such as arrival time is shortest, distance is shortest, prioritizing public roads, prioritizing toll roads, cost such as toll roads is low, or $CO_2$ emissions are low, for example.

<Route Notification Unit 307>

The route notification unit 307 sends route information calculated by the route setting unit 306 via the communication 32 to the car navigation device 1 or portable terminal 2.

<Client Terminal 4>

Figure 6:
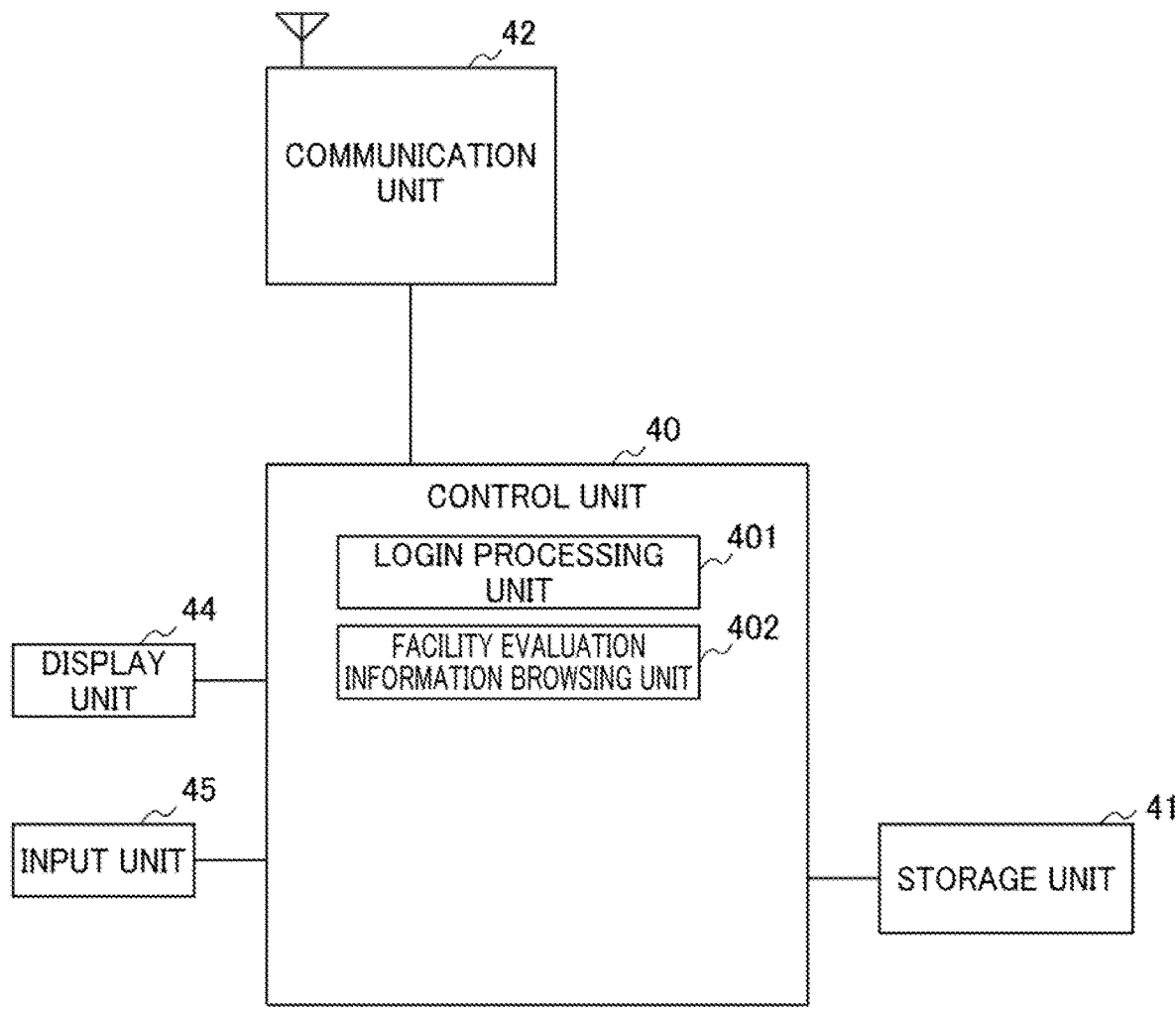
FIG. 6 is a view showing the configuration of a client terminal 4.
Figure 7:
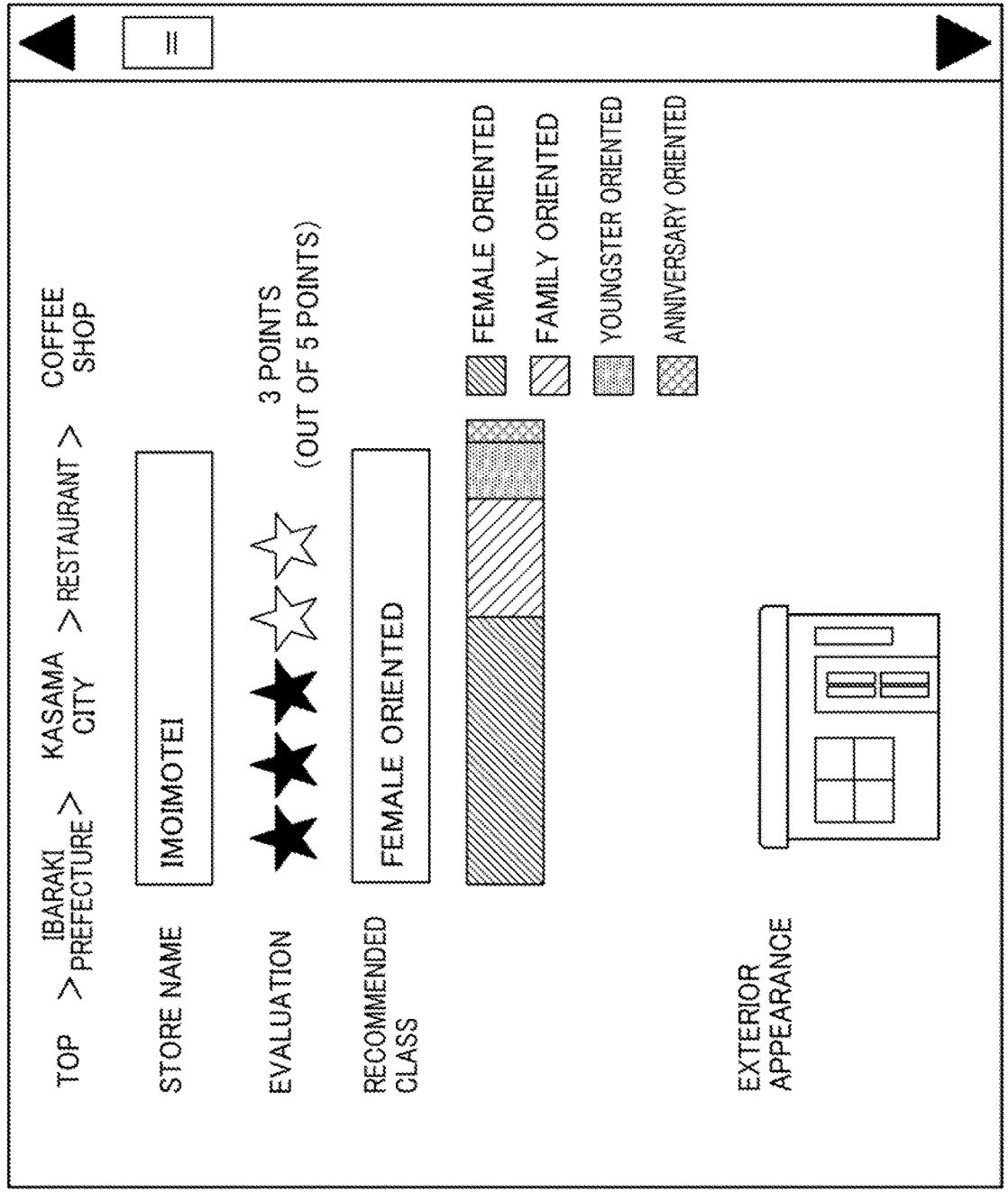
FIG. 7 is a view showing an example of facility evaluation information (user attribute_evaluation) displayed on the client terminal 4.

Next, the client terminal 4 will be explained. As shown in FIG. 6, the client terminal 4 includes at least a control unit 40, storage unit 41, communication unit 42, display unit 44 and input unit 45. The configuration of each part, for example, is similar to the configuration of each corresponding part of the portable terminal 2 and server system 3, respectively. The control unit 40 includes a login processing unit 401 and facility evaluation information browsing unit 402. The facility evaluation information browsing unit 402 retrieves or browses evaluation information of facilities by performing sending/receiving with the server system 3 via the communication unit 42. As the client terminal 4, various terminals can be used such as a personal computer, smart phone, or tablet terminal. The user of the client terminal 4 may be the user of the vehicle 5, or may not be the user. The facility evaluation information browsing unit 402 may be configured using a web browser or the like, for example. By configuring in this way, for example, information related to a specific facility is requested from the client terminal 4, and the evaluation information given in the requested facility information is browsed from the server system 3 (facility information providing unit 305). It should be noted that it may be configured so as to impart the functions of the client terminal 4 to the car navigation device 1 or portable terminal 2. FIG. 7 shows an example of the display of facility evaluation information (user attribute_evaluation). When a retrieval request for facility information is performed in the server system 3 from the client terminal 4, facility evaluation information (user attribute_evaluation) such as that shown in FIG. 7 is displayed.

An embodiment of each functional unit of the facility evaluation system 100 of the present invention has been explained above based on the configurations of the car navigation device 1 equipped to the vehicle 5, portable terminal 2, server system 3 and client terminal 4. However, the embodiment of each functional unit equipped to the server system 3 of the present invention, even if one computer, can be in one location, or spread out so as to be distributed to several locations, and execute by distributing to many computers mutually connected by a communication network. In addition, it is also possible to configure using a plurality of virtual computers on a cloud.

The server system 3 may be established as a server system configured from a Web server, application server, database server and a plurality of servers. In addition, the login processing unit 301, current position information processing unit 302, route setting unit 306, route notification unit 307 and subscriber information database creation unit 310 may be established as one server ("navigation server"), and the facility evaluation information creation/update unit 304, facility retrieval unit 304, facility information providing unit 305 and determination unit 303 may be established as a separate server ("facility evaluation server"). Each function equipped to the server system 3 can be executed by any computer. Therefore, a person skilled in the art can appropriately design each function equipped to the server system 3 to be allocated to certain computers.

(Processing of Facility Evaluation System 100)

Figure 8A:
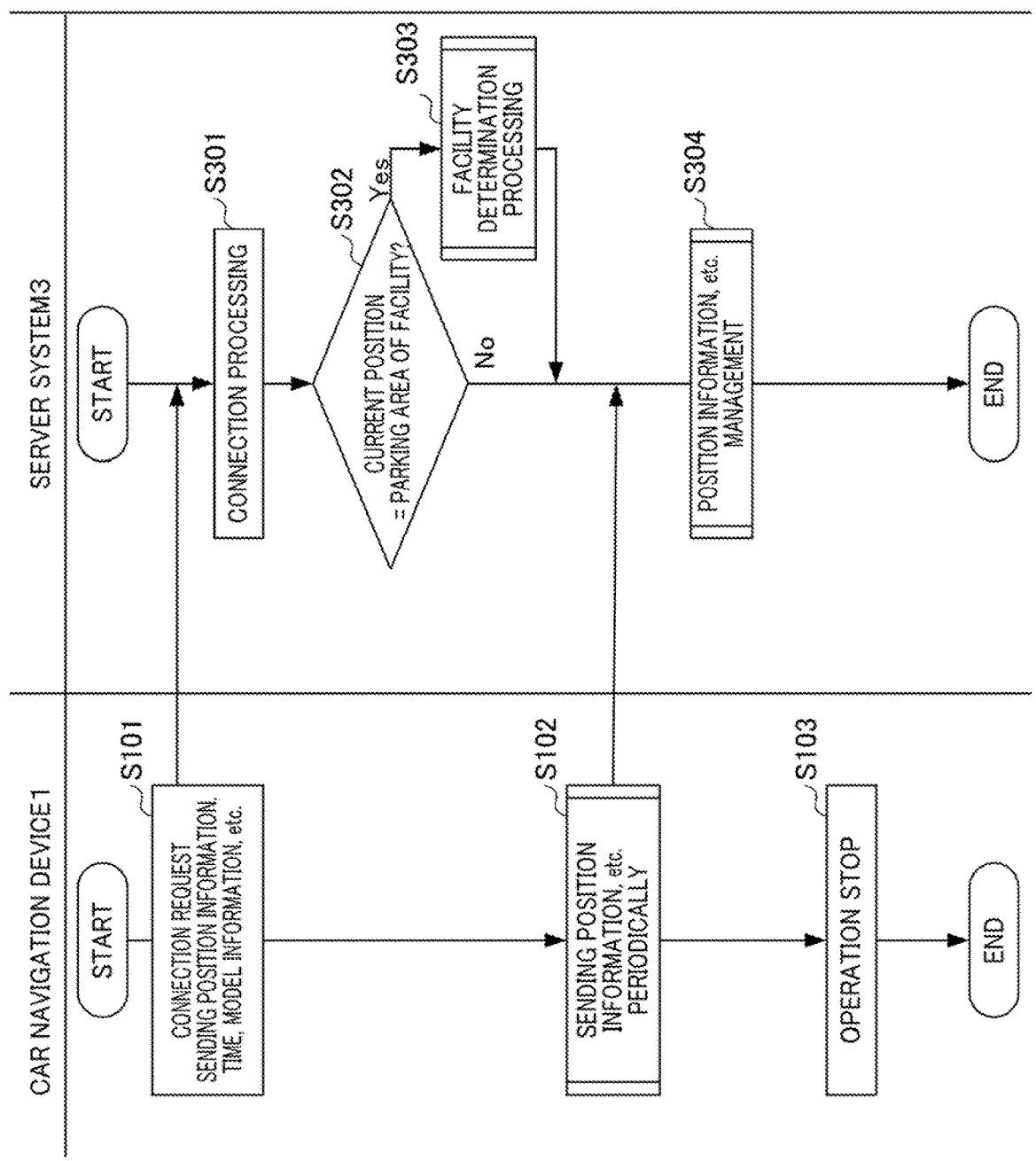
FIG. 8A is a flowchart showing the flow of processing of the facility evaluation system 100.
Figure 8B:
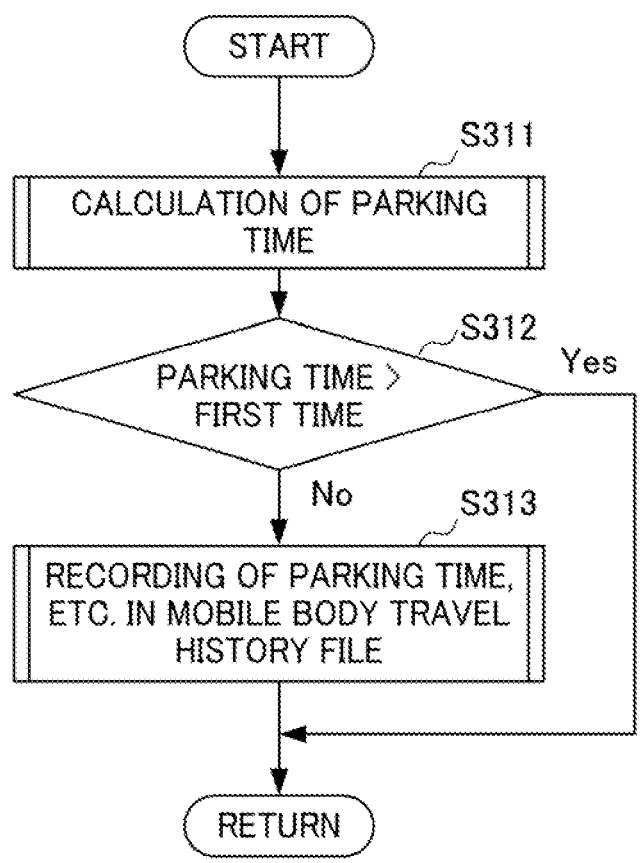
FIG. 8B is a flowchart showing the flow of processing of the facility evaluation system 100.

The configuration of the facility evaluation system 100 has been explained above. Next, the processing of the facility evaluation system 100 will be explained with the example of the car navigation device 1. FIGS. 8A and 8B are flowcharts showing the flow of processing of the facility evaluation system 100.

First, referencing FIG. 8A, the processing of the facility evaluation system 110 while the vehicle 5 starts the engine until stopping the engine will be explained. In Step S101, the car navigation device 1 automatically starts by the ignition switch of the vehicle 5 being turned ON (starting engine) by the driver, and the car navigation device 1 (connection processing unit 101) sends a login request (connection request) using the mobile body ID and password, and sends the current position, current time, model information, etc. of the vehicle 5 to the server system 3.

In Step S301, the server system 3 (login processing unit 301) performs connection processing with the car navigation device 1, and creates a connection history record for managing the current position, current time, model information, etc. received from the car navigation device 1 in the connection history information area 314.

In Step S302, the server system 3 (determination unit 303) determines whether the vehicle 5 corresponding to this vehicle ID parked at the parking area of an evaluation target facility, based on the position information, etc. of this vehicle 5 at the moment the engine was started. In the case of this vehicle 5 being parked at the parking area of the evaluation target facility (YES), the processing advances to Step S303. In the case of the vehicle 5 not being parked at the parking area of the evaluation target facility (NO), the processing advances to Step S304.

In Step S303, the server system 3 performs the facility determination processing described later, and then advances to Step S304.

In Step S102, the car navigation device 1 (position information update unit 102) periodically sends the mobile body ID, current position of the vehicle 5, current time, state of the vehicle 5, etc. to the server system 3. In Step S304, the server system 3 (current position information processing unit 302) stores the current position of the vehicle 5, current time, state of the vehicle 5, etc. which is periodically received from the car navigation device to be added in the connection history record. It should be noted that Step S102 and Step S304 are executed repeatedly. For example, it may be configured so as to repeatedly execute every predetermined interval time, and may be configured so as to repeatedly execute every time traveling a predetermined distance. The mode of repeatedly executing is not limited to these. It should be noted that the car navigation device 1 (position information update unit 102), in the case of stopping at a location other than a road, may be configured so as to send the mobile body ID, current position of the vehicle 5, current time, state of the vehicle 5, etc. to the server system 3. By configuring in this way, the server system 3 can acquire the stop position information in the case of parking at the parking lot of a facility.

In Step S103, the car navigation device 1 stops operation by the ignition switch of the vehicle 5 being turned OFF (stopping engine) by the driver.

Next, facility determination processing flow will be explained by referencing FIG. 8B. In Step S311, the server system 3 (determination unit 303) references the latest connection history record, and calculates a parked time of the vehicle 5 corresponding to this vehicle ID, by acquiring the position information and latest time information when stopping the engine of this vehicle 5. In Step S312, it is determined whether the parked time of the vehicle 5 exceeds a first time. In the case of the parked time of the vehicle 5 exceeding the first time (YES), the processing returns. In the case of the parked time of the vehicle 5 being no more than the first time (NO), the processing advances to Step S313.

In Step S313, the server system 3 (determination unit 303) stores information such as the model information of the vehicle 5, facility ID of this facility at which this vehicle 5 parked, item information of the facility parked, parked time, etc. to be linked to the mobile body ID in the mobile body travel history file 316. The processing records the history information (e.g., vehicle ID, model information, facility ID, visiting time/date to this facility, parked time, etc.) of the fact that this vehicle 5 visited the facility in the facility information area 313 of the storage unit 31, and returns the processing.

It should be noted that, rather than the facility determination processing being real-time processing, as mentioned already, the determination unit 303 may configure so as to store information such as the facility ID of this facility at which this vehicle 5 parked, item information of facility parked and parked time in the mobile body travel history file 316, by performing batch processing based on an aggregate of connection history records of the mobile body ID (or vehicle ID, user ID) stored in the storage unit 31 on this day, for example. In addition, rather than batch processing, it may be configured so as to perform mini-batch processing at the moment when a predetermined amount of the connection history record was accumulated or every predetermined time period.

It should be noted that, in the case of the mobile body being the portable terminal 2, the processing is simply explained of the facility evaluation system 100 when the vehicle 5 starts the engine until stopping the engine. More specifically, except for the points explained below, it is possible to explain the operation of the facility evaluation system 100 in the case of the portable terminal 2, by substituting car navigation device 2 with portable terminal 2 in the aforementioned steps.

<Points of Difference>

In Step S101, the ignition switch of the vehicle 5 is turned ON (starting engine) by the driver, the portable terminal 2 is paired with the vehicle 5 to login into the server system 3, and the current position information measured by the vehicle 5 or portable terminal 2, time information, model information, etc. are uploaded to the server system 3. In Step S103, with the portable terminal 2, the pairing between the vehicle 5 and portable terminal 2 is released by the ignition switch of the vehicle being turned OFF (stopping engine) by the driver, and the current position upon being released is uploaded to the server system 3 as the final vehicle position, i.e. parked position. For processing other than this processing, it is possible to explain the processing of the facility evaluation system 100 while the vehicle 5 starts the engine until stopping the engine in the case of being the portable terminal 2, by substituting car navigation device 1 with portable terminal 2 in the aforementioned steps.

Figure 9B:
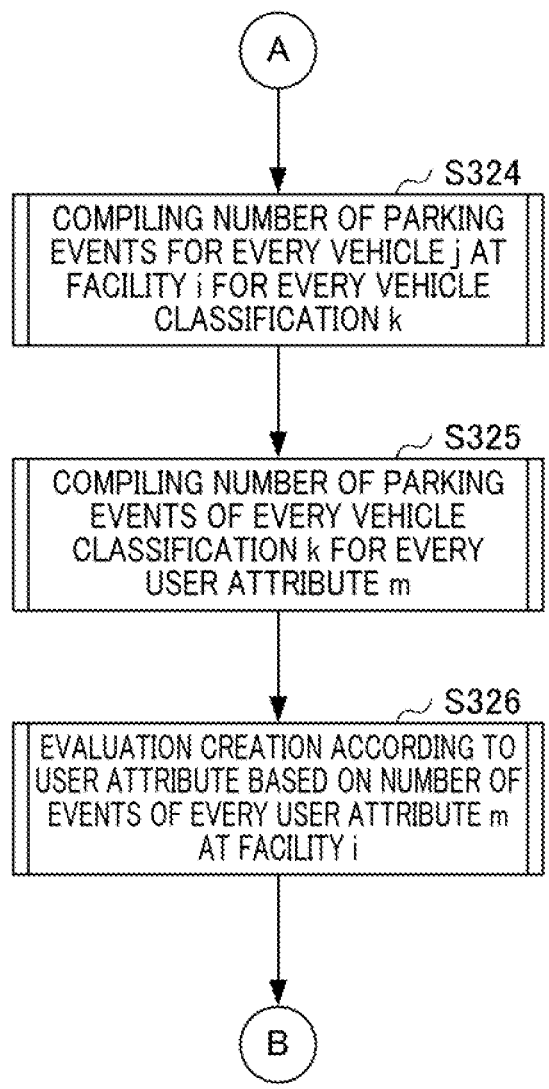
FIG. 9B is a flowchart showing the flow of processing in a case of giving a facility evaluation by the facility evaluation system 100.
Figure 9E:
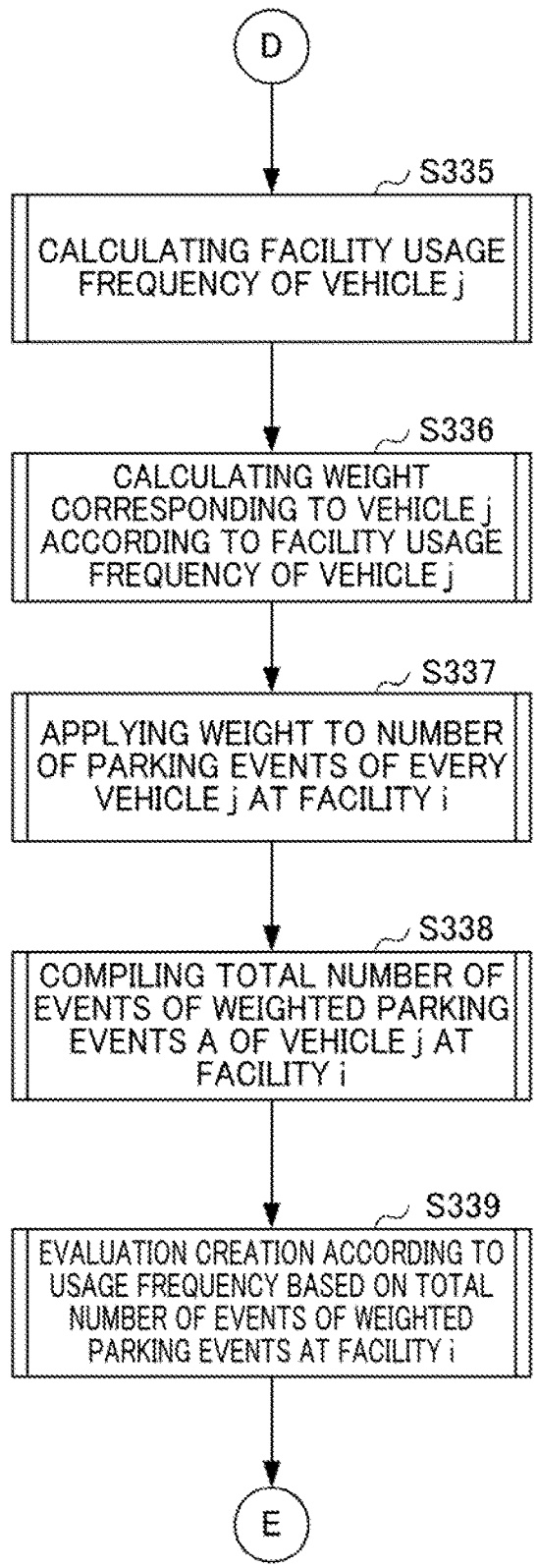
FIG. 9E is a flowchart showing the flow of processing in a case of giving a facility evaluation by the facility evaluation system 100.
Figure 9F:
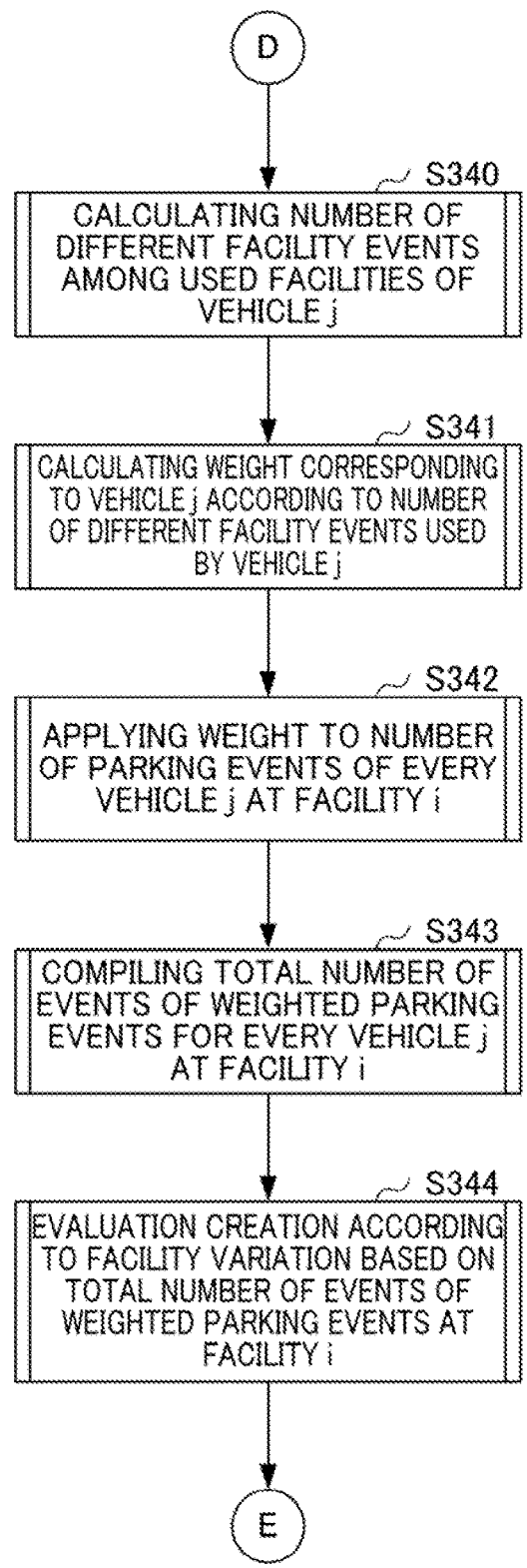
FIG. 9F is a flowchart showing the flow of processing in a case of giving a facility evaluation by the facility evaluation system 100.

Next, the processing in the case of giving a facility evaluation by way of the facility evaluation system 100 will be explained by referencing FIGS. 9A to 9F. FIG. 9A shows a flowchart of the creation processing of number of vehicle visits_evaluation; FIG. 9B shows a flowchart of creation processing of user attribute_evaluation; FIG. 9C shows a flowchart of creation processing of visit distance_evaluation; FIG. 9D shows a flowchart of creation processing of repeat_evaluation; FIG. 9E shows a flowchart of creation processing of usage frequency_evaluation; and FIG. 9F shows a flowchart of creation processing of variation_evaluation. It should be noted that, as a matter of convenience, the suffix i is used for identifying each facility, the suffix j is used for identifying each vehicle 5, the suffix k is used for identifying the vehicle classification, and the suffix m is used for identifying the user attribute. The processing in the case of giving a facility evaluation may be configured so as to be performed in a daily batch or the like, for example.

<Creation of Number of Vehicle Visits_Evaluation>

When referencing FIG. 9A, the server system 3 (facility evaluation creation/update unit 303) references the mobile body travel history file 316, and counts a number of vehicles parked at a facility i in a predetermined time period for every facility i located in a predetermined regional area for every vehicle j, for example, in Step S321. In other words, in a case of a vehicle j being parked n-times at facility i, the number of vehicles of vehicle j parked at facility i ($N_1(i,j)$ is defined as n. In Step S322, the server system 3 (facility evaluation creation/update unit 303) calculates a total $S_1(i)$ of the number of vehicles of all vehicles j parked at facility i within a predetermined time period according to Formula 1.

$$S_1(i)=\Sigma_j N_1(i,j) \tag{Formula 1}$$

In Step S323, the server system 3 (facility evaluation creation/update unit 303) creates a number of vehicle visits_evaluation of facility i, based on the number of vehicles $S_1(i)$ parked at facility i within the predetermined time period.

<Creation of User-Attribute_Evaluation>

When referencing FIG. 9B, in Step S324, the server system 3 (facility evaluation creation/update unit 303) compiles the number of vehicles $N_1(i,j)$ parked at the facility i of vehicle j for every vehicle classification k of vehicle j, and calculates the number $N_2(i,k)$ of all vehicles j of vehicle classification k parked at facility i according to Formula 2.

$$N_2(i,k)=\Sigma_j N_1(i,j) \tag{Formula 2}$$

Herein, $\Sigma_j$ indicates the total of vehicles j corresponding to vehicle classification k. In Step S325, the server system 3 (facility evaluation creation update unit 303) compiles the number of vehicles $N_2(i,k)$ of vehicles of vehicle classification k parked at this facility i for every user attribute m, and calculates the number of vehicles $N'_2(i,m)$ of all vehicles of the user of user attribute m parked at this facility i according to Formula 3.

$$N'_2(i,m)=\Sigma_k N_2(i,k) \tag{Formula 3}$$

Herein, $\Sigma_k$ indicates the total of vehicle classification k corresponding to user attribute m. In Step S326, the server system 3 (facility evaluation creation/update unit 303) creates a user-attribute_evaluation of vehicles parked at facility i with a predetermined time period.

<Creation of Visit-Distance_Evaluation>

When referencing FIG. 9C, in Step S327, the server system 3 (facility evaluation creation/update unit 303) calculates a weight $W_1(i,j)$ according to a travel distance (or distance on a map) from the present address (e.g., home address) of the user of vehicle j parked at facility i until the facility i. In Step S328, the server system 3 (facility evaluation creation/update unit 303) calculates the number of vehicles $N_3(i,j)$ (=$N_1(i,j) \times W_1(i,j)$) adjusted based on the weight $W_1(i,j)$ to the number of vehicles $N_1(i,j)$ of vehicle j parked at facility i. In Step S329, the server system 3 (facility evaluation creation/update unit 303) calculates a total $S_3(i)$ of the number of vehicles adjusted based on the weight $W_1(i,j)$ of all vehicles j parked at facility i within a predetermined time period according to Formula 4.

$$S_3(i)=\Sigma_j N_3(i,j) \tag{Formula 4}$$

In Step S330, the server system 3 (facility evaluation creation/update unit 303) creates a visit-distance_evaluation of facility i, based on the number of vehicles $S_3(i)$ parked at facility i within a predetermined time period.

<Creation of Repeat_Evaluation>

When referencing FIG. 9D, in Step S331, the server system 3 (facility evaluation creation/update unit 303) calculates the weight $W_2(i,j)$ according to the number of vehicles $N_1(i,j)$ of vehicle j parked at facility i. In Step S332, the server system 3 (facility evaluation creation/update unit 303) calculates the number of vehicles $N_4(i,j)$ (=$N_1(i,j) \times W_2(i,j)$) adjusted based on the weight $W_2(i,j)$ to the number of vehicles $N_1(i,j)$ of vehicle j parked at facility i. In Step S333, the server system 3 (facility evaluation creation/update unit 303) calculates the total $S_4(i)$ of the number of vehicles adjusted based on the weight $W_2(i,j)$ of all vehicles j parked at facility i within a predetermined time period according to Formula 5.

$$S_4(i)=\Sigma_j N_4(i,j) \tag{Formula 5}$$

In Step S334, the server system 3 (facility evaluation creation update unit 303) creates a repeat_evaluation of facility i, based on a total $S_4(i)$ of the number of vehicles adjusted based on the weight $W_2(i,j)$, parked at facility i within a predetermined time period.

<Creation of Usage Frequency_Evaluation>

When referencing FIG. 9E, in Step S335, the server system 3 (facility evaluation creation/update unit 303) calculates a usage frequency $F_1(j)$ by counting the number of times vehicle j visited any facility i within a predetermined time period. For example, in a case of the vehicle j visiting facility 1 three times within a predetermined time period, visiting facility 2 twice, and visiting facility 3 four times, the usage frequency $F_1(j)$ of vehicle j becomes 9(=3+2+4). In Step S336, the server system 3 (facility evaluation creation/update unit 303) calculates the weight $W_3(j)$ according to the usage frequency $F_1(j)$ of vehicle j. In Step S337, the server system 3 (facility evaluation creation/update unit 303) calculates the number of vehicles $N_5(i,j)$ (=$N_1(i,j) \times W_3(j)$) adjusted based on the weight $W_3(j)$ to the number of vehicles $N_1(i,j)$ of vehicle j. In Step S338, the server system 3 (facility evaluation creation/update unit 303) calculates the total $S_5(i)$ of the number of vehicles adjusted based on the weight $W_3(j)$ of all vehicles j parked at facility i within a predetermined time period according to Formula 6.

$$S_5(i)=\Sigma_j N_5(i,j) \tag{Formula 6}$$

In Step S339, the server system 3 (facility evaluation creation/update unit 303) creates a repeat_evaluation of facility i based on the total $S_5(i)$ of the number of vehicles adjusted based on the weight $W_3(j)$, parked at facility i within a predetermined time period.

<Creation of Facility Variation_Evaluation>

When referencing FIG. 9F, in Step S340, the server system 3 (facility evaluation creation/update unit 303) calculates a number of events $F_2(j)$ of used facilities by counting a number of events of different facilities visited by vehicle j at different facilities i within a predetermined time period. For example, in the case of the vehicle j visiting facility 1, facility 2 and facility 3 within a predetermined time period, the number of events $F_2(j)$ of used facilities of vehicle j becomes 3. In Step S341, the server system 3

(facility evaluation creation update unit 303) calculates the weight $W_4(j)$ according to the number of events $F_2(j)$ of used facilities of vehicle j. In Step S337, the server system 3 (facility evaluation creation/update unit 303) calculates the number of vehicles $N_6(i,j)$ $(=N_1(i,j) \times W_4(j))$ adjusted based on the weight $W_4(j)$ to the number of vehicles $N_1(i,j)$ of vehicle j. In Step S342, the server system 3 (facility evaluation creation/update unit 303) calculates the total $S_6(i)$ of the number of vehicles adjusted based on the weight $W_4(j)$ of all vehicles j parked at facility i within a predetermined time period according to Formula 7.

$$S_5(i)=\Sigma_j N_6(i,j) \qquad \text{(Formula 7)}$$

In Step S343, the server system 3 (facility evaluation creation/update unit 303) creates a facility-variation evaluation of facility i, based on the total $S_6(i)$ of the number of vehicles adjusted based on the weight $W_3(j)$ parked at facility i within a predetermined time period. The facility evaluation system 100 of the first embodiment has been explained above. However, the present invention is not to be limited to the first embodiment.

Modified Example 1

In the first embodiment, rather than the facility determination processing being real-time processing, the determination unit 303 may be configured so as to store information such as the facility ID of this facility at which the vehicle 5 is parked, item information at the facility parked and parking time in the mobile body travel history file 316, by performing batch processing based on the aggregate of the connection history record of the mobile body ID (or vehicle ID, user ID) stored in the storage unit 31 on that day, for example, Modified Example 2

Although the server system 3 is realized as one server in the first embodiment, as another embodiment, it may be established as a distributed processing system which distributes the respective functions of the server system 3 to a plurality of servers appropriately. In addition, the respective functions of the server system 3 may be realized using a virtual server function, etc. on a cloud.

According to the facility evaluation system 100 explained above, the following such effects are exerted.

(1) The server system 3 includes the facility evaluation information creation/update unit 304 which gives an evaluation to an evaluation target facility based on parking information obtained by determining whether the current position of the mobile body was parked in a parking area of the evaluation target facility. It thereby becomes possible to create facility evaluation information (rating information) having high confidence made by excluding arbitrary evaluation.

(2) The facility evaluation information creation/update unit 304 further gives an evaluation to the evaluation target facility for every type of model information. In addition, the facility evaluation information creation/update unit 304 further includes the user attribute correspondence table having a high correlation with the vehicle classification. It thereby becomes possible to create "recommendation information" on what kind of user group the evaluation target facility is recommended, based on the association of the user attribute having high correlation with the vehicle classification.

(3) The facility evaluation information creation/update unit 304 further gives an evaluation to the evaluation target facility weighted by the number of vehicles visiting the facility from a far distance. The facility visited by a user from farther is evaluated highly, and it is possible to visualize "facility wanting to visit even from far away".

(4) The facility evaluation information creation/update unit 304 further gives an evaluation to the evaluation target facility weighted by the number of vehicles repeatedly visiting the target evaluation facility. It is thereby possible to give an evaluation reflecting repeaters, and possible to visualize "facility wanting to visit several times".

(5) The facility evaluation information creation/update unit 304 further gives an evaluation to the evaluation target facility weighted by the number of parked vehicles of vehicle 5 having high facility usage frequency, in the case of the vehicle 5 having high facility usage frequency visiting the evaluation target facility. It is thereby possible to visualize "facility a user having high facility usage frequency also wants to visit".

(6) The facility evaluation information creation/update unit 304 further gives an evaluation to the evaluation target facility weighted by the number of parked vehicles of the vehicle 5 having a large number of events of different used facilities, in a case of the vehicle 5 having many events of different used facilities visiting the evaluation target facility. It is thereby possible to visualize "facility where people visiting a wide variety of facility also want to visit".

The server system 3 of the present invention can be implemented by way of hardware, or may be implemented by way of software. In other words, the functional configurations in FIGS. 2, 3, 4 and 6 are merely exemplifications, and are not to be particularly limited thereto. That is, it is sufficient for the functions which can execute a series of processing related to the navigation function of the present invention as a whole to be provided to the server 2, and which functional block is used in order to realize these functions is not limited to the examples of FIGS. 2, 3, 4 and 6 in particular. In addition, one functional block may be constituted by hardware alone, may be constituted by software alone, or may be constituted by a combination of these.

In the case of causing a series of processing to be executed by way of software, programs constituting this software are installed from a network or recording medium to a computer or the like. The computer may be a computer which is built into dedicated hardware. In addition, the computer may be a computer capable of executing various types of functions by installing various types of programs.

The recording medium including such a program is not only constituted by the removable media 31 distributed separately from the device body for providing the program to the user, and is constituted by recording media, etc. provided to the user in a state incorporated in the device body in advance. The removable media 31, for example, is constituted by a magnetic disk (including floppy disk), flexible disk, optical disk, magneto-optical disk or the like. An optical disk, for example, is constituted by CD-ROM (Compact Disk-Read Only Memory), DVD (Digital Versatile Disk) or the like. A magneto-optical disk is constituted by MD (Mini-Disk) or the like. In addition, the recording medium provided to the user in a state incorporated in the device body in advance, for example, is constituted by a hard disk included in the storage unit 11 of FIG. 2, storage unit 21 of FIG. 3, storage unit 31 of FIG. 4 or storage unit 41 of FIG. 5 in which the program is recorded.

EXPLANATION OF REFERENCE NUMERALS 100 system
1 car navigation device 10 control unit
101 connection processing unit
102 position information update unit
105 route guidance unit
11 storage unit
12 wireless unit
13 sensor unit
14 display unit
15 input unit
2 portable terminal
20 control unit
201 portable-terminal_connection processing unit
202 portable-terminal_position information update unit
205 portable-terminal_route guidance unit
206 portable-terminal_connection information acquisition unit
21 storage unit
22 wireless unit
23 sensor unit
24 display unit
25 input unit
26 short-distance communication unit
3 server system
30 control unit
301 login processing unit
302 current position information processing unit
303 determination unit
304 facility evaluation information creation/update unit
305 facility evaluation information providing unit
306 route setting unit
307 route notification unit
31 storage unit
311 mobile body information area
312 map information area
313 facility information area
314 connection history information area
315 vehicle classification/user attribute correspondence table
316 mobile body travel history file
32 communication unit
33 timing unit
34 display unit
35 input unit
4 client terminal
5 vehicle

The invention claimed is:

1. A facility evaluation device serving as a server system, wherein the facility evaluation device receives information via a communication network from a mobile body equipped to or paired with a vehicle, the facility evaluation device configured to:
receive from the mobile body a current position information and a travel history information of the vehicle as well as time information from when an ignition switch of the vehicle is turned ON until when the ignition switch is turned OFF;
store information of facilities and information of parking areas of facilities in which the vehicle can park;
obtain parking information in real time by determining whether the vehicle is parked in a parking area of an evaluation target facility from the current position information and the travel information of the vehicle as well as the time information received from the mobile body and by measuring a parked time period of parking in the parking area based on the time information at which the most recent turning OFF of the ignition switch of the vehicle prior to the turning ON of the ignition switch, give an evaluation to the evaluation target facility based on the parking information in case of the parked time period of parking being no more than a predetermined time period; and
in response to a request from the mobile body and/or a client terminal, output the evaluation for the evaluation target facility.

2. The facility evaluation device according to claim 1, wherein the facility evaluation device is further configured to receive model information of a vehicle corresponding to the mobile body,
wherein the facility evaluation device is further configured to give an evaluation to the evaluation target facility based on the model information; and
wherein the facility evaluation device is further configured to output the evaluation for the evaluation target facility based on the model information.

3. The facility evaluation device according to claim 2, further comprising a vehicle classification/user attribute correspondence table which associates a vehicle classification and a user attribute having a high correlation therewith,
wherein the facility evaluation device is further configured to give an evaluation to the evaluation target facility for every user attribute, based on the vehicle classification/user attribute correspondence table, and
wherein the facility evaluation device is further configured to output the evaluation for the evaluation target facility based on the user attribute.

4. The facility evaluation device according to claim 1, wherein the facility evaluation device is further configured to receive mobile body starting point position information, which is position information of a departure point of the mobile body, or current address of a vehicle or user corresponding to the mobile body, and
wherein the facility evaluation device is further configured to give an evaluation to the evaluation target facility according to a distance between the mobile body starting point position information and a parking area of the evaluation target facility.

5. The facility evaluation device according to claim 1, wherein the facility evaluation device is further configured to compile a number of times determining whether the current position the vehicle received from of the mobile body was parked in a parking area of an evaluation target facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

6. The facility evaluation device according to claim 1, wherein the facility evaluation device is further configured to compile a number of times determining whether the current position of the vehicle received from the mobile body was parked in a parking area of any facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

7. The facility evaluation device according to claim 1, wherein the facility evaluation device is further configured to compile a number of times determining that the current position of the vehicle received from the mobile body was parked in a parking area of a different facility within a predetermined time period, and to give an evaluation to the evaluation target facility so as to weight an evaluation by the mobile body determined as having a large number of different facilities parked within a predetermined time period as higher than an evaluation by another mobile body determined as having relatively few number of different facilities parked within a predetermined time period.

8. The facility evaluation device according to claim 2,
wherein the facility evaluation device is further configured to receive mobile body starting point position information, which is position information of a departure point of the mobile body, or current address of a vehicle or user corresponding to the mobile body, and
wherein the facility evaluation device is further configured to give an evaluation to the evaluation target facility according to a distance between the mobile body starting point position information and a parking area of the evaluation target facility.

9. The facility evaluation device according to claim 3,
wherein the facility evaluation device is further configured to receive mobile body starting point position information, which is position information of a departure point of the mobile body, or current address of a vehicle or user corresponding to the mobile body, and
wherein the facility evaluation device is further configured to give an evaluation to the evaluation target facility according to a distance between the mobile body starting point position information and a parking area of the evaluation target facility.

10. The facility evaluation device according to claim 2,
wherein the facility evaluation device is further configured to compile a number of times determining whether the current position of the vehicle received from the mobile body was parked in a parking area of an evaluation target facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

11. The facility evaluation device according to claim 3,
wherein the facility evaluation device is further configured to compile a number of times determining whether the current position of the vehicle received from the mobile body was parked in a parking area of an evaluation target facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

12. The facility evaluation device according to claim 4,
wherein the facility evaluation device is further configured to compile a number of times determining whether the current position of the vehicle received from the mobile body was parked in a parking area of an evaluation target facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

13. The facility evaluation device according to claim 2,
wherein the facility evaluation device is further configured to compile a number of times determining whether the current position of the vehicle received from the mobile body was parked in a parking area of any facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

14. The facility evaluation device according to claim 3,
wherein the facility evaluation device is further configured to compile a number of times determining whether the current position of the vehicle received from the mobile body was parked in a parking area of any facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

15. The facility evaluation device according to claim 4,
wherein the facility evaluation device is further configured to compile a number of times determining whether the current position of the vehicle received from the mobile body was parked in a parking area of any facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

16. The facility evaluation device according to claim 5,
wherein the facility evaluation device is further configured to compile a number of times determining whether the current position of the vehicle received from the mobile body was parked in a parking area of any facility within a predetermined time period, and to give an evaluation to the evaluation target facility so as to weight an evaluation by the mobile body having a large number of times determined as parked within a predetermined time period as higher than an evaluation by another mobile body determined as having a relative few number of times parked within a predetermined time period.

17. The facility evaluation device according to claim 2,
wherein the facility evaluation device is further configured to compile a number of times determining that the current position of the vehicle received from the mobile body was parked in a parking area of a different facility within a predetermined time period, and to give an evaluation to the evaluation target facility so as to weight an evaluation by the mobile body determined as having a large number of different facilities parked within a predetermined time period as higher than an evaluation by another mobile body determined as having relatively few number of different facilities parked within a predetermined time period.

\* \* \* \* \*